US010727699B2

(12) United States Patent
Yuasa

(10) Patent No.: US 10,727,699 B2
(45) Date of Patent: Jul. 28, 2020

(54) POWER TRANSMISSION DEVICE AND POWER RECEPTION DEVICE

(71) Applicant: Toyota Jidosha Kabushiki Kaisha, Toyota-shi Aichi-ken (JP)

(72) Inventor: Hiroaki Yuasa, Miyoshi Aichi-ken (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 0 days.

(21) Appl. No.: 16/023,301

(22) Filed: Jun. 29, 2018

(65) Prior Publication Data
US 2019/0006884 A1 Jan. 3, 2019

(30) Foreign Application Priority Data

Jul. 3, 2017 (JP) .................. 2017-130400

(51) Int. Cl.
| | |
|---|---|
| *H01F 38/14* | (2006.01) |
| *H02J 50/12* | (2016.01) |
| *H02J 7/02* | (2016.01) |
| *H01F 27/24* | (2006.01) |
| *H01F 27/28* | (2006.01) |
| *B60L 53/12* | (2019.01) |
| *H02J 50/40* | (2016.01) |

(52) U.S. Cl.
CPC .............. *H02J 50/12* (2016.02); *B60L 53/12* (2019.02); *H01F 27/24* (2013.01); *H01F 27/2871* (2013.01); *H01F 38/14* (2013.01); *H02J 7/025* (2013.01); *H02J 50/40* (2016.02)

(58) Field of Classification Search
CPC . H02J 50/12; H02J 50/40; H02J 7/025; H01F 27/24; H01F 27/2871; H01F 38/14; B60L 53/12

USPC .................. 307/104; 320/108, 109
See application file for complete search history.

(56) References Cited

U.S. PATENT DOCUMENTS

| | | | |
|---|---|---|---|
| 7,741,734 | B2 | 6/2010 | Joannopoulos et al. |
| 2007/0222542 | A1 | 9/2007 | Joannopoulos et al. |
| 2008/0278264 | A1 | 11/2008 | Karalis et al. |
| 2009/0195332 | A1 | 8/2009 | Joannopoulos et al. |
| 2009/0195333 | A1 | 8/2009 | Joannopoulos et al. |
| 2009/0224856 | A1 | 9/2009 | Karalis et al. |
| 2009/0267709 | A1 | 10/2009 | Joannopoulos et al. |
| 2009/0267710 | A1 | 10/2009 | Joannopoulos et al. |

(Continued)

FOREIGN PATENT DOCUMENTS

| | | |
|---|---|---|
| AU | 2006269374 B2 | 10/2009 |
| AU | 2007349874 A2 | 1/2010 |

(Continued)

*Primary Examiner* — Rexford N Barnie
*Assistant Examiner* — Toan T Vu
(74) *Attorney, Agent, or Firm* — Dinsmore & Shohl LLP

(57) ABSTRACT

A power transmission device includes: a first coil; and a second coil. The first coil and the second coil are configured such that a first current direction and a second current direction are opposite to each other. The first coil includes a first adjacent portion located adjacent to the second coil, and a first spacer portion located on an opposite side of the first adjacent portion. The second coil includes a second adjacent portion located adjacent to the first coil, and a second spacer portion located on an opposite side of the second adjacent portion with respect to the second winding axis. The first adjacent portion is located higher than the first spacer portion.

3 Claims, 18 Drawing Sheets

(56) References Cited

U.S. PATENT DOCUMENTS

| | | |
|---|---|---|
| 2010/0096934 A1 | 4/2010 | Joannopoulos et al. |
| 2010/0102639 A1 | 4/2010 | Joannopoulos et al. |
| 2010/0102640 A1 | 4/2010 | Joannopoulos et al. |
| 2010/0102641 A1 | 4/2010 | Joannopoulos et al. |
| 2010/0117455 A1 | 5/2010 | Joannopoulos et al. |
| 2010/0117456 A1 | 5/2010 | Karalis et al. |
| 2010/0123353 A1 | 5/2010 | Joannopoulos et al. |
| 2010/0123354 A1 | 5/2010 | Joannopoulos et al. |
| 2010/0123355 A1 | 5/2010 | Joannopoulos et al. |
| 2010/0127573 A1 | 5/2010 | Joannopoulos et al. |
| 2010/0127574 A1 | 5/2010 | Joannopoulos et al. |
| 2010/0127575 A1 | 5/2010 | Joannopoulos et al. |
| 2010/0133918 A1 | 6/2010 | Joannopoulos et al. |
| 2010/0133919 A1 | 6/2010 | Joannopoulos et al. |
| 2010/0133920 A1 | 6/2010 | Joannopoulos et al. |
| 2010/0171370 A1 | 7/2010 | Karalis et al. |
| 2010/0181844 A1 | 7/2010 | Karalis et al. |
| 2010/0187911 A1 | 7/2010 | Joannopoulos et al. |
| 2010/0201205 A1 | 8/2010 | Karalis et al. |
| 2010/0207458 A1 | 8/2010 | Joannopoulos et al. |
| 2010/0225175 A1 | 9/2010 | Karalis et al. |
| 2010/0231053 A1 | 9/2010 | Karalis et al. |
| 2010/0237706 A1 | 9/2010 | Karalis et al. |
| 2010/0237707 A1 | 9/2010 | Karalis et al. |
| 2010/0237708 A1 | 9/2010 | Karalis et al. |
| 2010/0253152 A1 | 10/2010 | Karalis et al. |
| 2010/0264745 A1 | 10/2010 | Karalis et al. |
| 2013/0127409 A1 | 5/2013 | Ichikawa |
| 2013/0193749 A1 | 8/2013 | Nakamura et al. |
| 2014/0327391 A1* | 11/2014 | Niederhauser ........ B60L 11/182 320/108 |
| 2015/0008877 A1 | 1/2015 | Ichikawa et al. |
| 2016/0285317 A1* | 9/2016 | Maniktala ................ H02J 50/12 |

FOREIGN PATENT DOCUMENTS

| | | |
|---|---|---|
| AU | 2010200044 A1 | 1/2010 |
| AU | 2006269374 C1 | 3/2010 |
| CA | 2615123 A1 | 1/2007 |
| CA | 2682284 A1 | 10/2008 |
| CN | 101258658 A | 9/2008 |
| CN | 101682216 A | 3/2010 |
| CN | 101860089 A | 10/2010 |
| EP | 1902505 A2 | 3/2008 |
| EP | 2130287 A1 | 12/2009 |
| IN | 735/DELNP/2008 | 5/2008 |
| IN | 6195/DELNP/2009 | 7/2010 |
| JP | 2009-501510 A | 1/2009 |
| JP | 2013-110822 A | 6/2013 |
| JP | 2013-126327 A | 6/2013 |
| JP | 2013-146148 A | 7/2013 |
| JP | 2013-146154 A | 7/2013 |
| JP | 2013154815 A | 8/2013 |
| JP | 2016-526280 A | 9/2016 |
| KR | 20080031398 A | 4/2008 |
| KR | 20100015954 A | 2/2010 |
| WO | 2007008646 A2 | 1/2007 |
| WO | 2008118178 A1 | 10/2008 |
| WO | 2014/179320 A1 | 11/2014 |

\* cited by examiner

POWER TRANSMISSION DEVICE AND POWER RECEPTION DEVICE

CROSS-REFERENCE TO RELATED APPLICATIONS

This a nonprovisional application claims priority to Japanese Patent Application No. 2017-130400 filed on Jul. 3, 2017 with the Japan Patent Office, the entire contents of which are hereby incorporated by reference.

BACKGROUND

Field

The present disclosure relates to a power transmission device and a power reception device.

Description of the Background Art

Conventionally, a contactless charging system configured to contactlessly transmit electric power has been known. A contactless charging system includes a power transmission device and a power reception device. The power transmission device is configured to contactlessly transmit electric power to the power reception device (see Japanese Patent Laying-Open Nos. 2013-154815, 2013-146154, 2013-146148, 2013-110822, and 2013-126327).

For example, a vehicle charging pad disclosed in Japanese Patent National Publication No. 2016-526280 includes a first coil, a second coil and a modular ferrite block.

The first coil and the second coil are arranged in the modular ferrite block. The first coil and the second coil each are a multi-winding loop coil. The first coil and the second coil are arranged adjacent to each other.

The modular ferrite block is formed in a plate shape. The modular ferrite block includes a plurality of ferrite tiles.

SUMMARY

In the vehicle charging pad disclosed in Japanese Patent National Publication No. 2016-526280, when the above-mentioned vehicle charging pad receives electric power from a power transmission pad, a current flows through the first coil and the second coil of the vehicle changing pad, so that the vehicle charging pad receives electric power.

In the power reception device like the vehicle charging pad as described above, however, unless the shape and the arrangement of two coils are designed to improve the coupling coefficient, the power reception device tends to be increased in structure size since two coils are mounted therein. The same problem occurs also in the power transmission device.

The present disclosure has been made in light of the above-described problems. An object of the present disclosure is to provide a power transmission device and a power reception device that are improved in coupling coefficient and reduced in size.

A power transmission device according to the present disclosure includes: a first coil formed so as to surround a first winding axis extending in an up-down direction; and a second coil formed so as to surround a second winding axis extending in the up-down direction. The first coil and the second coil are configured such that a first current direction and a second current direction are opposite to each other during power transmission. In the first current direction, a current flowing through the first coil flows so as to be wound around the first winding axis, and in the second current direction, a current flowing through the second coil flows so as to be wound around the second winding axis. The first coil includes: a first adjacent portion located adjacent to the second coil; and a first spacer portion located on an opposite side of the first adjacent portion with respect to the first winding axis. The second coil includes: a second adjacent portion located adjacent to the first coil; and a second spacer portion located on an opposite side of the second adjacent portion with respect to the second winding axis. The first adjacent portion is located higher than the first spacer portion.

According to the above-described power transmission device, a magnetic flux is formed around the first coil and the second coil during power transmission. A magnetic flux is formed so as to surround each of the first spacer portion of the first coil and the second spacer portion ox the second coil. A magnetic flux is formed also around each of the first adjacent portion of the first coil and the second adjacent portion of the second coil. The first adjacent portion and the second adjacent-portion are located adjacent to each other. Thus, the magnetic flux formed around each of the first adjacent portion and the second adjacent portion is formed so as to extend over the first adjacent portion and the second adjacent portion.

The effective radius of the magnetic flux flowing so as to extend over the first adjacent portion and the second adjacent portion is larger than the effective radius of the magnetic flux flowing so as to surround the first spacer portion or the second spacer portion.

The magnetic flux flowing so as to extend over the first adjacent portion and the second adjacent portion is more likely to expand upward, with the result that this magnetic flux is more likely to reach the power reception device disposed above the power transmission device.

In the above-described power transmission device the first adjacent portion is located higher than the first spacer portion, and the second adjacent portion is located higher than the second spacer portion.

The first adjacent portion and the second adjacent portion are located closer to the power reception device than the first spacer portion and the second spacer portion are. Thus, the magnetic flux formed so as to extend over the first adjacent portion and the second adjacent portion (the magnetic firm from the power transmission device) is more likely to reach the power reception device. Accordingly, the coupling coefficient between the power transmission device and the power reception device can be increased.

The coupling coefficient between the power transmission device and the power reception device can be improved. Thus, even when the first coil and the second coil are reduced in size, electric power can be excellently transmitted to the power reception device, and the power transmission device can be reduced in size.

The foregoing and other objects, features, aspects and advantages of the present disclosure will become more apparent from the following detailed description of the present disclosure when taken in conjunction with the accompanying drawings.

DESCRIPTION OF THE EMBODIMENTS

Figure 1:
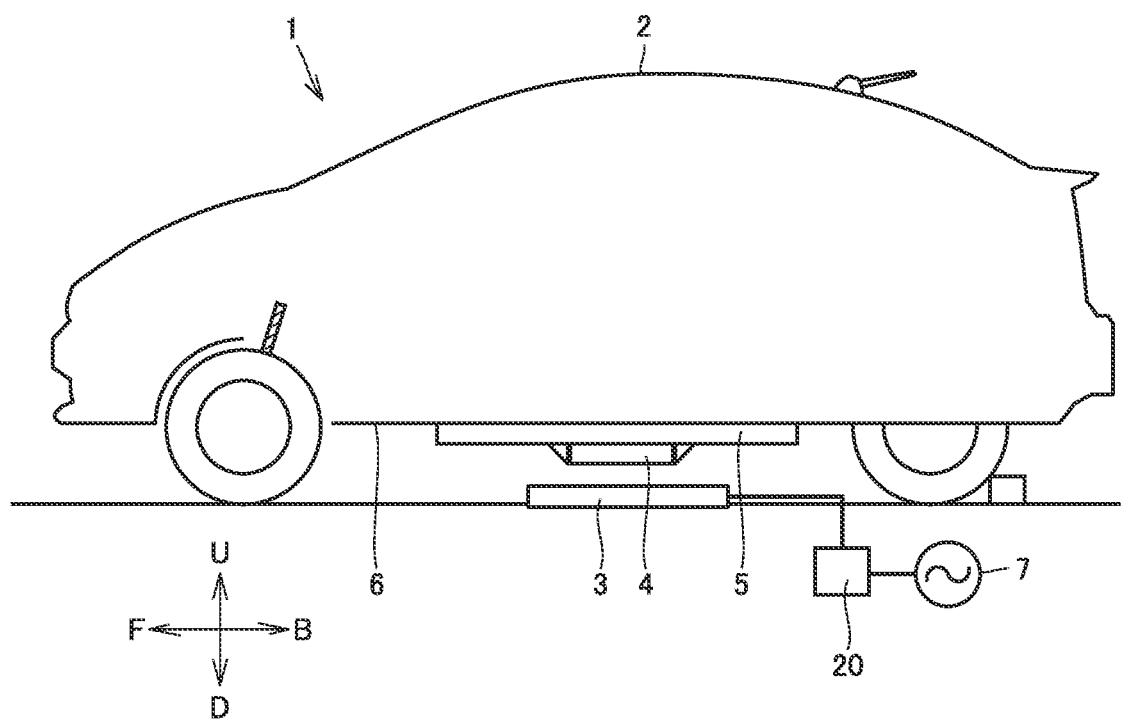
FIG. 1 is a schematic diagram schematically showing a contactless charging system 1.
Figure 2:
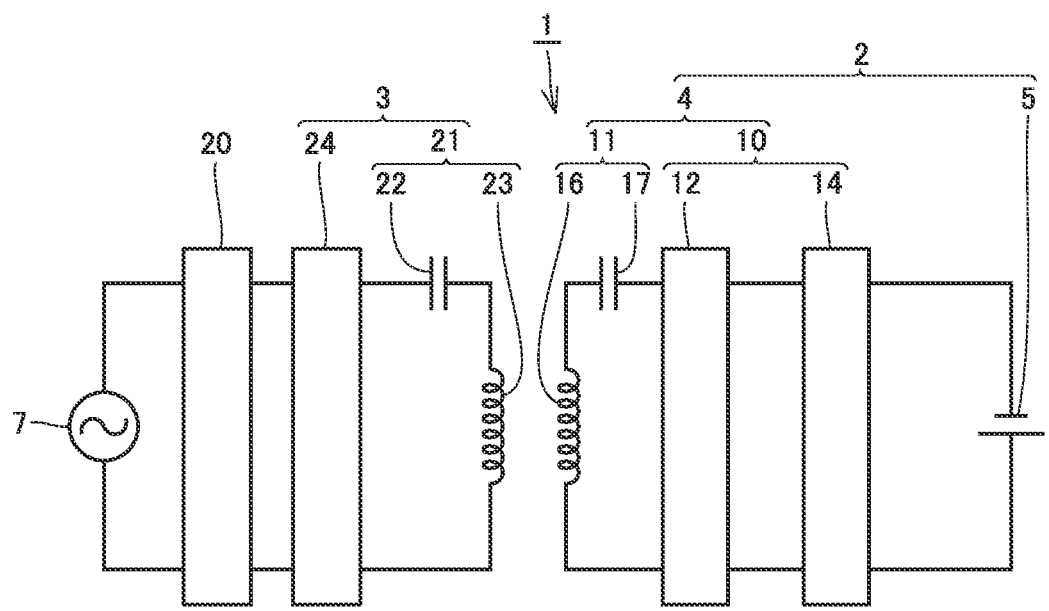
FIG. 2 is a block diagram schematically showing contactless charging system 1.

Referring to FIGS. 1 to 29, a power transmission device and a power reception device according, to each of the present first to third embodiments will be hereinafter described. Among the configurations shown in FIGS. 1 to 29, the same or substantially the same configurations will be designated by the same reference characters, and the description thereof may not be repeated.

First Embodiment

FIG. 1 is a schematic diagram schematically showing a contactless charging system 1. Contactless charging system 1 includes a power transmission device 3, a vehicle 2, a power supply 7, and a converter 20.

Power supply 7 is connected to converter 20. Converter 20 includes an inverter and a converter.

Vehicle 2 includes a power reception device 4 and a power storage device 5. In an example shown in FIG. 1, power storage device 5 is provided on the lower surface of a floor panel 6 of vehicle 2. Power reception device 4 is provided on the lower surface of power storage device 5.

Power reception device 4 includes a resonator 11 and equipment 10. Resonator 11 includes a power reception coil 16 and a capacitor 17. Capacitor 17 is connected in series to power reception coil 16. Capacitor 17 and power reception coil 16 constitute an LC resonator. Resonator 11 has a Q value of 100 or more. Equipment 10 includes a rectifier 12 and a filter 14. Rectifier 12 is connected to resonator 11. Filter 14 is connected to rectifier 32 and power storage device 5. Power storage device 5 serving as a battery or a capacitor is a chargeable and dischargeable device.

Power transmission device 3 includes a resonator 21 and a filter 24. Resonator 21 includes a power transmission coil 23 and a capacitor 22. Capacitor 22 is connected in series to power transmission coil 23. Capacitor 22 and power transmission coil 23 constitute an LC resonator. Resonator 21 has a Q value of 100 or more.

Filter 24 is connected to resonator 21 and converter 20. Filter 24 includes a plurality of coils and capacitors. Converter 20 is connected to power supply 7 and filter 24.

The following is an explanation about the state where electric power is contactlessly transmitted from power transmission device 3 to power reception device 4 in contactless charging system 1 configured as described above. Converter 20 adjusts the frequency and the voltage of alternating-current (AC) power that is supplied from power supply 7, and then supplies the adjusted AC power to filter 24.

Filter 24 removes noise from the AC power supplied from converter 20, and then supplies the resultant AC power to resonator 21. When the AC power & supplied to resonator 21, an electromagnetic field is formed around power transmission coil 23. The frequency of the AC power supplied to power transmission coil 23 is about several ten kHz to about one hundred and several ten kHz, or about 70 kHz or more aid about 100 kHz or less.

Power reception coil 16 receives electric power from the electromagnetic field formed around power transmission coil 23. The frequency of the AC current flowing through power reception coil 16 during power reception is, for example, about several ten kHz to about one hundred and several ten kHz, and specifically, about 70 kHz or more: and about 100 kHz or less. Rectifier 12 converts the AC power supplied from resonator 11 into direct-current (DC) power, and supplies the converted DC power to filter 14. Filter 14 removes noise from the DC power supplied from rectifier 12, and supplies the resultant DC power to power storage device 5.

Then, the configuration of power transmission device 3 will be hereinafter described with reference to FIG. 3 and the like.

Figure 3:
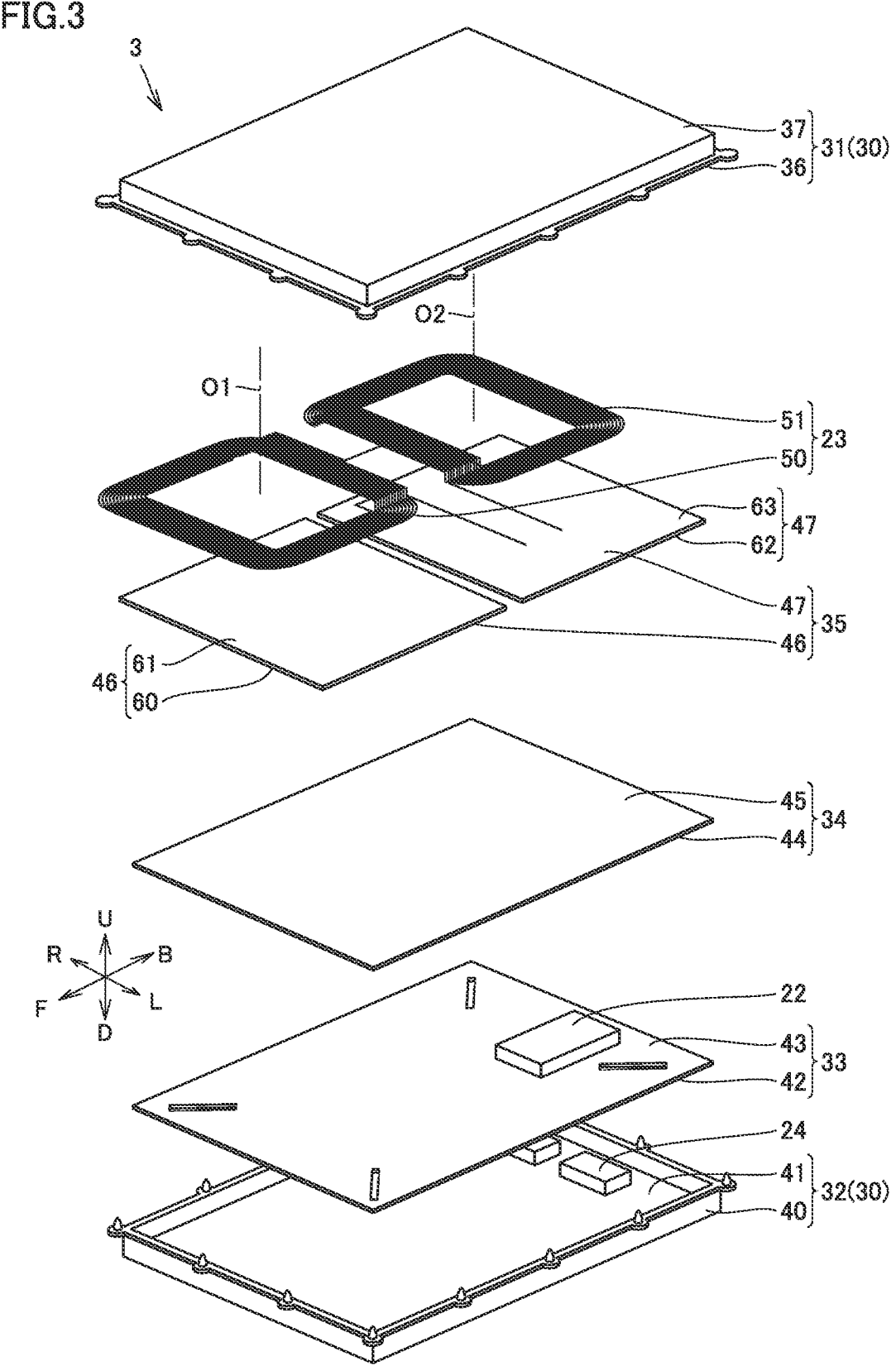
FIG. 3 is an exploded perspective view showing a power transmission device 3.

FIG. 3 is an exploded perspective view showing power transmission devices. Power transmission device 3 includes a case 30, a substrate 33, a metal plate 34, a ferrite plate 35, a filter 24, a capacitor 22, and a power transmission coil 23.

Filter 24, substrate 33, capacitor 22, metal plate 34, ferrite plate 35, and power transmission coil 23 are housed in case 30.

Case 30 includes an upper cover 31 and a lower cover 32. Upper cover 31 is disposed on the upper surface side of power transmission device 3, and formed of resin. Upper cover 31 includes an upper wall 37 and a side wall 36. Side wall 36 is formed so as to extend downward from tire outer peripheral edge of upper wall 37.

Lower cover 32 is disposed on the ground side. Lower cover 32 is formed of metal such as aluminum or an aluminum alloy.

Lower cover 32 includes a bottom wall 41 and a side wall 40. Side wall 40 is formed so as to extend upward from the outer peripheral edge of bottom wall 41.

Substrate 33 is disposed on the upper surface side of bottom wall 41. Substrate 33 is formed in a plate shape, and includes a lower surface 42 and an upper surface 43.

Filter 24 is disposed on the lower surface 42 side of substrate 33. Capacitor 22 is disposed on upper surface 43.

Metal plate 34 is disposed on the upper surface 43 side of substrate 33. Metal plate 34 is formed of a metal material such as aluminum or an aluminum alloy. Metal plate 34 is formed in a plate shape, and includes a lower surface 44 and an upper surface 45.

Ferrite plate 35 is disposed on upper surface 45 of metal plate 34. Ferrite plate 35 includes a divided ferrite plate 46 and a divided ferrite plate 47. Divided ferrite plate 46 and divided ferrite plate 47 are provided so as to be arranged in the front-rear direction of vehicle 2 that is stopped above power transmission device 3.

Divided ferrite plates 46 and 47 each are formed in a plate shape. Divided ferrite plate 46 includes an upper surface 61 and a lower surface 60. Divided ferrite plate 47 includes a lower surface 62 and an upper surface 63.

Power transmission coil 23 includes a first coil 50 and a second coil 51. First coil 50 and second coil 51 are disposed to be arranged in the front-rear direction of vehicle 2 that is stopped above power transmission device 3. First coil 50 is formed so as to surround a winding axis O1 extending in the up-down direction. Second coil 51 is formed so as to surround a winding axis O2 extending in the up-down direction.

First coil 50 and second coil 51 each are a spiral-shaped flat coil. Although first coil 50 and second coil 51 each are formed in an approximately rectangular shape, first coil 50 and second coil 51 each may be formed in various shapes.

Figure 4:
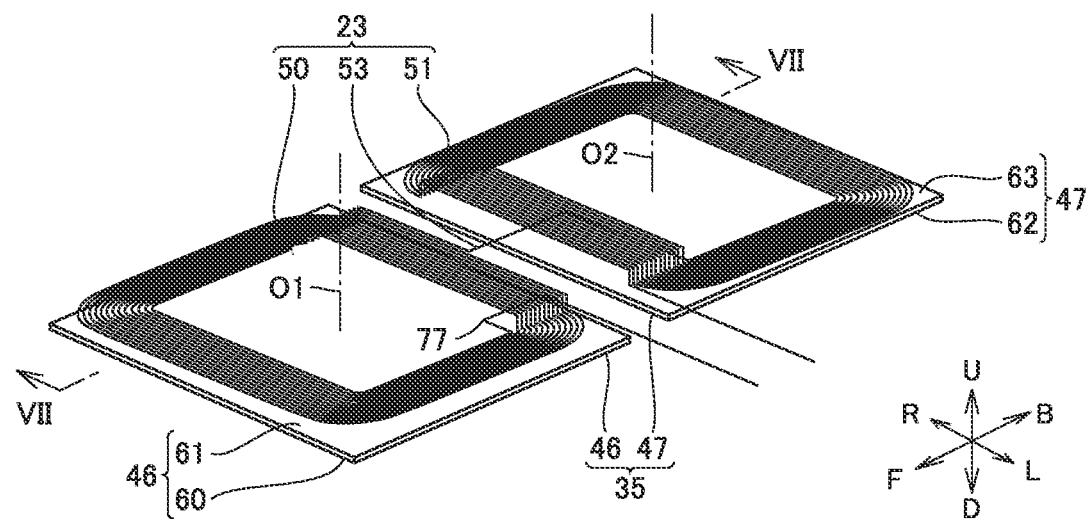
FIG. 4 is a perspective view schematically showing a power transmission coil 23 and a ferrite plate 35.

FIG. 4 is a perspective view schematically showing a power transmission coil 23 and a ferrite plate 35. First coil 50 is disposed on upper surface 61 of divided ferrite plate 46. Second coil 51 is disposed on upper surface 63 of divided ferrite plate 4. Power transmission coil 23 includes a connection line 53 that connects first coil 50 and second coil 51.

Figure 5:
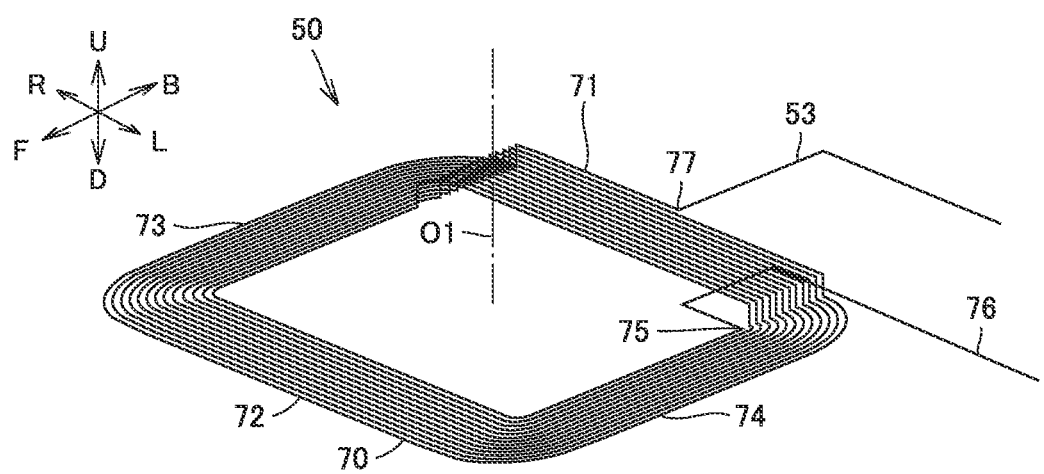
FIG. 5 is a perspective view schematically showing a first coil 50.

FIG. 5 is a perspective view schematically showing first coil 50. In FIGS. 4 and 5, first coil 50 includes an adjacent portion 71, a spacer portion 72, a connection portion 73, a connection portion 74, an inner peripheral end 75, an outer peripheral end 77, and a lead line 76.

Adjacent portion 71 is located adjacent to second coil 51. Spacer portion 72 is located on the opposite side of adjacent portion 71 with respect to winding axis O1. Connection portion 73 connects one end of adjacent portion 71 and one end of spacer portion 72. Connection portion 74 connects the other end of adjacent portion 71 and the other end of spacer portion 72.

One end of adjacent portion 71 is formed so as to extend upward from the end of connection portion 73. The other end of adjacent portion 71 is formed so as to extend upward from the end of connection portion 74. Adjacent portion 71 extends from its one end to its other end in a linear shape. In an example shown in FIG. 5 and the like, adjacent portion 71 and spacer portion 72 are formed so as to extend in the right-left direction of vehicle 2. Connection portions 73 and 74 are also formed in a linear shape so as to extend in the front-rear direction of vehicle 2.

Spacer portion 72 and connection portions 73 and 74 are disposed on upper surface 61 of divided ferrite plate 46. Thus, adjacent portion 71 is located higher than spacer portion 72. Specifically, adjacent portion 71 is located higher than spacer portion 72 and connection portions 73 and 74.

Inner peripheral end 75 is located on the inner periphery of first coil 50. Outer peripheral end 77 is located on the outer periphery of first coil 50. Lead line 16 is connected to inner peripheral end 75. Connection line 53 is connected to outer peripheral end 77.

First coil 50 configured as described above is formed by winding a coil wire 70 so as to surround winding axis O1. Specifically, first coil 50 is formed so as to be reduced in distance from winding axis O1 from outer peripheral end 77 toward inner peripheral end 75 every winding of coil wire 70.

Thus, first coil 50 extends in the direction of leftward rotation (in the counter-clockwise direction) from outer peripheral end 77 toward inner peripheral end 75.

Load line 76 connected to inner peripheral end 75 is pulled out to the outside through a gap between adjacent portion 71 and divided ferrite plate 46.

Figure 6:
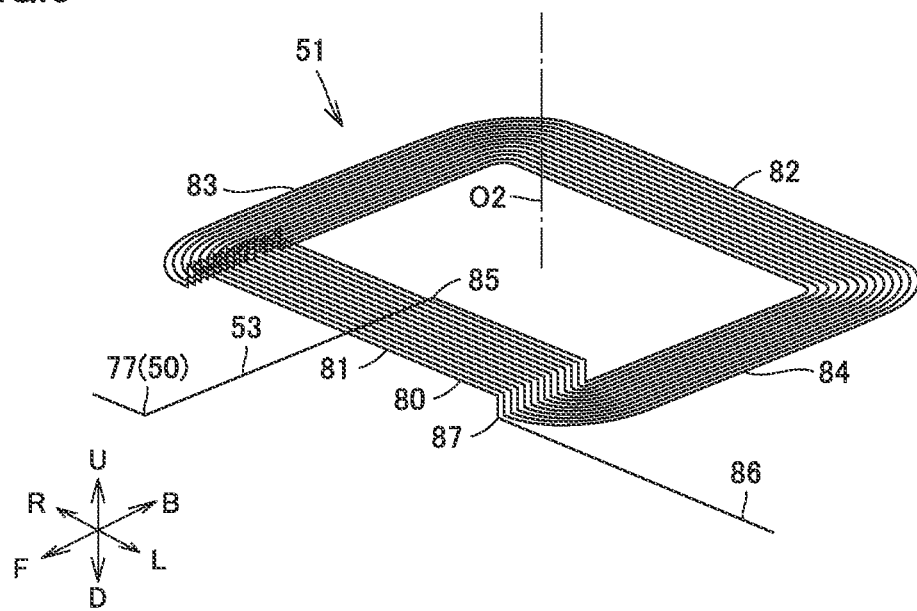
FIG. 6 is a perspective view showing a second coil 51.

FIG. 6 is a perspective view showing second coil 51. Second coil 51 includes an adjacent portion 81, a spacer portion 82, a connection portion 83, a connection portion 84, an inner peripheral end 85, an outer peripheral end 87, and a lead portion 86.

Adjacent portion 81 is located adjacent to first coil 50. Specifically, adjacent portion 81 is located adjacent to adjacent portion 71 of first coil 50. Spacer portion 82 is located on the opposite side of adjacent portion 81 with respect to winding axis O2. Connection portion 83 connects one end of adjacent portion 81 and one end of spacer portion 82. Connection portion 84 connects the other end of adjacent portion 81 and the other end of spacer portion 82.

One end of adjacent portion 81 is formed so as to extend upward from the end of connection portion 83. The other end of adjacent portion 81 is formed so as to extend upward front the end of connection portion 84. Also, adjacent portion 81 extends from its one end to its other end in a linear shape. Adjacent portion 81 and adjacent portion 71 are formed so as to extend in the same direction.

In an example shown in FIG. 6 and the like, adjacent portion 81 and spacer portion 82 are formed so as to extend in the right-left direction of vehicle 2. Connection portions 83 and 84 are also formed in a linear shape so as to extend in the front-rear direction of vehicle 2.

Spacer portion 82 and connection portions 83 and 84 are disposed on upper surface 63 of divided ferrite plate 47. Thus, adjacent portion 81 is located higher than spacer portion 82. Specifically, adjacent portion 81 is located higher than spacer portion 82 and connection portions 83 and 84.

Inner peripheral end 85 is located on the inner periphery of second coil 51. Outer peripheral end 87 is located on the outer periphery of second coil 51.

Second coil 51 configured as described above is formed by winding a coil wire 80 so as to surround winding axis O2.

Specifically, second coil 51 is formed to be reduced in distance: from winding axis O2 from outer peripheral end 87 toward inner peripheral end 85 every winding of coil wire 80.

Thus, second coil 51 extends in the direction of rightward rotation (in the clockwise direction) from outer peripheral end 87 toward inner peripheral end 85.

Lead portion 86 is connected to outer peripheral end 87. Connection line 53 is connected to inner peripheral end 85.

Figure 7:
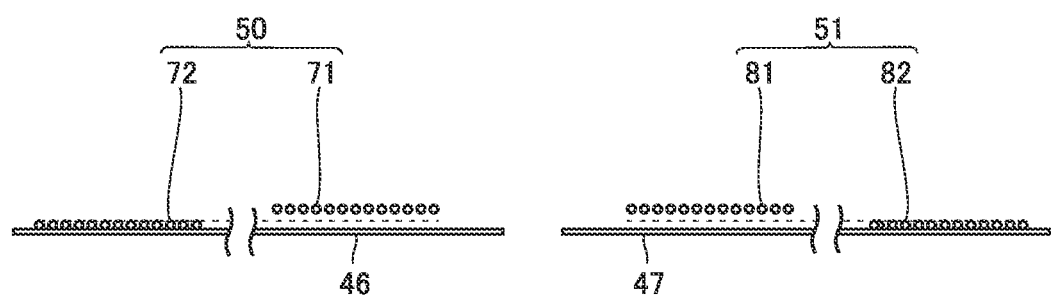
FIG. 7 is a cross-sectional view taken along a line VII-VII in FIG. 4.

FIG. 7 is a cross-sectional view taken along a line VII-VII in FIG. 4. Adjacent portion 71 of first coil 50 is located higher than the upper end of spacer portion 72. Similarly, adjacent portion 81 of second coil 51 is located higher than the upper end of spacer portion 82.

Figure 8:
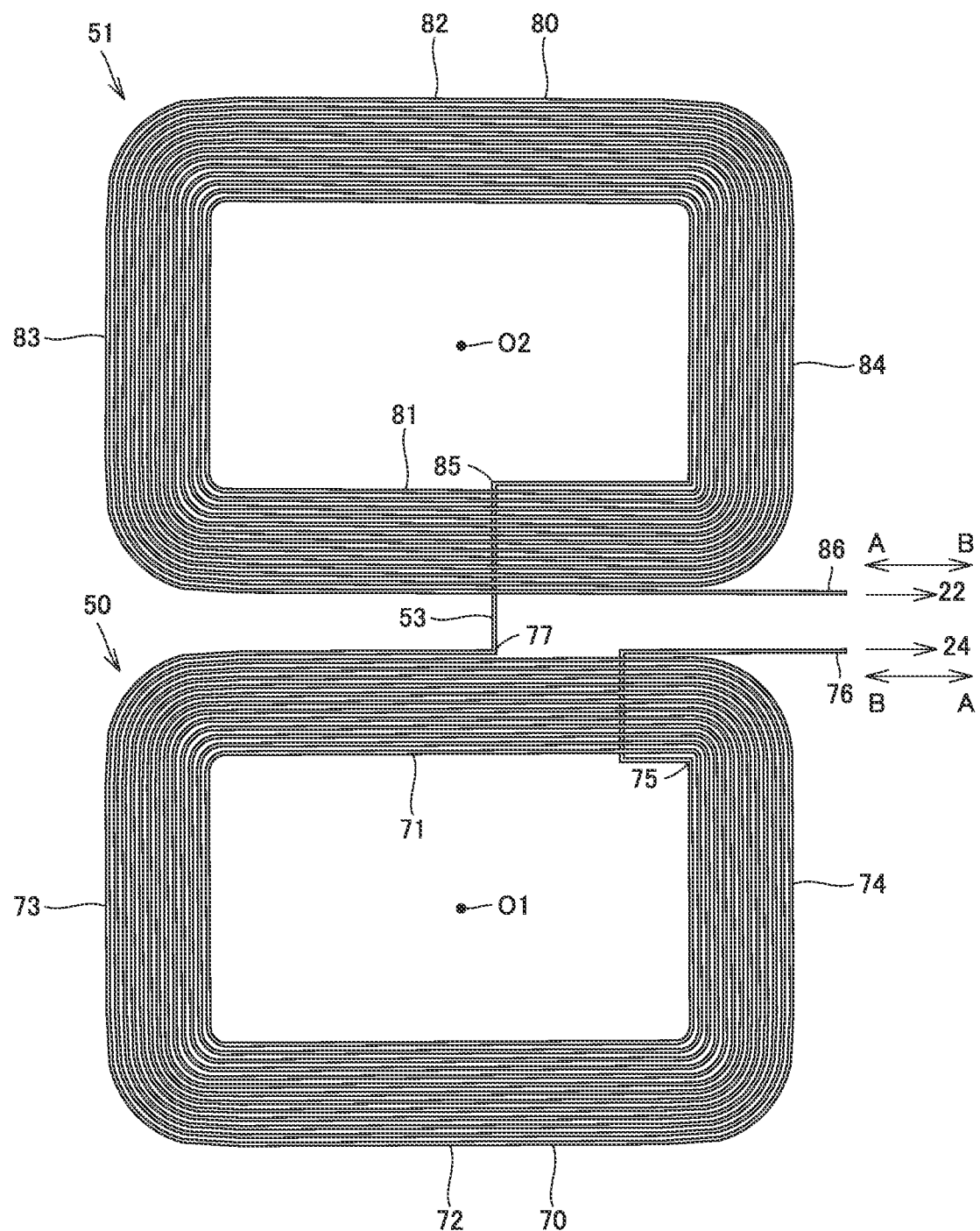
FIG. 8 is a plan view showing a power transmission coil 23.

FIG. 8 is a plan view showing power transmission coil 23. Lead portion 86 of second coil 51 is connected to capacitor 22, and lead line 76 is connected to filter 24.

During power transmission, the frequency of the AC current flowing through power transmission coil 23 is about 70 kHz or more and about 100 kHz or less. The wavelength of the AC current of this frequency is several hundred meters. On the other hand, the total length of coil wires 70 and 80 and connection line 53 that constitute power transmission coil 23 is about several meters to about a dozen or more meters.

There is almost no current phase difference inside power transmission coil 23. Thus, for example, when a current flows through lead portion 86 in a current direction A, a current flows through lead line 76 in current direction A.

When the current flows through lead portion 86 in current direction A, the current direction in which an AC current flowing through second coil 51 flows so as to be wound around winding axis O2 (the second current direction) is the direction of rightward rotation (the clockwise direction). On the other hand, the current direction in which an AC current flowing through first coil 50 flows so as to be wound around winding axis O2 (the first current direction) is the direction of leftward direction (the counter-clockwise direction).

Furthermore, when a current flows through lead portion 86 in a current direction B, the current direction in which an AC current flowing through second coil 51 flows so as to fee wound around winding axis O2 (the second current direction) is the direction of leftward rotation (the counter-clockwise direction). On the other hand, the current direction in which an AC current flowing through first coil 50 flows so as to be wound around winding axis O2 (the first current direction) is the direction of rightward direction (the clockwise direction).

In this way, power transmission coil 23 according to the present first embodiment is formed such that, during power transmission, the current direction in which a current flowing through first coil 50 flows so as to be wound around winding axis O1 is opposite to the current direction in which a current flowing through second coil 51 flows so as to be wound around winding axis O2.

Figure 9:
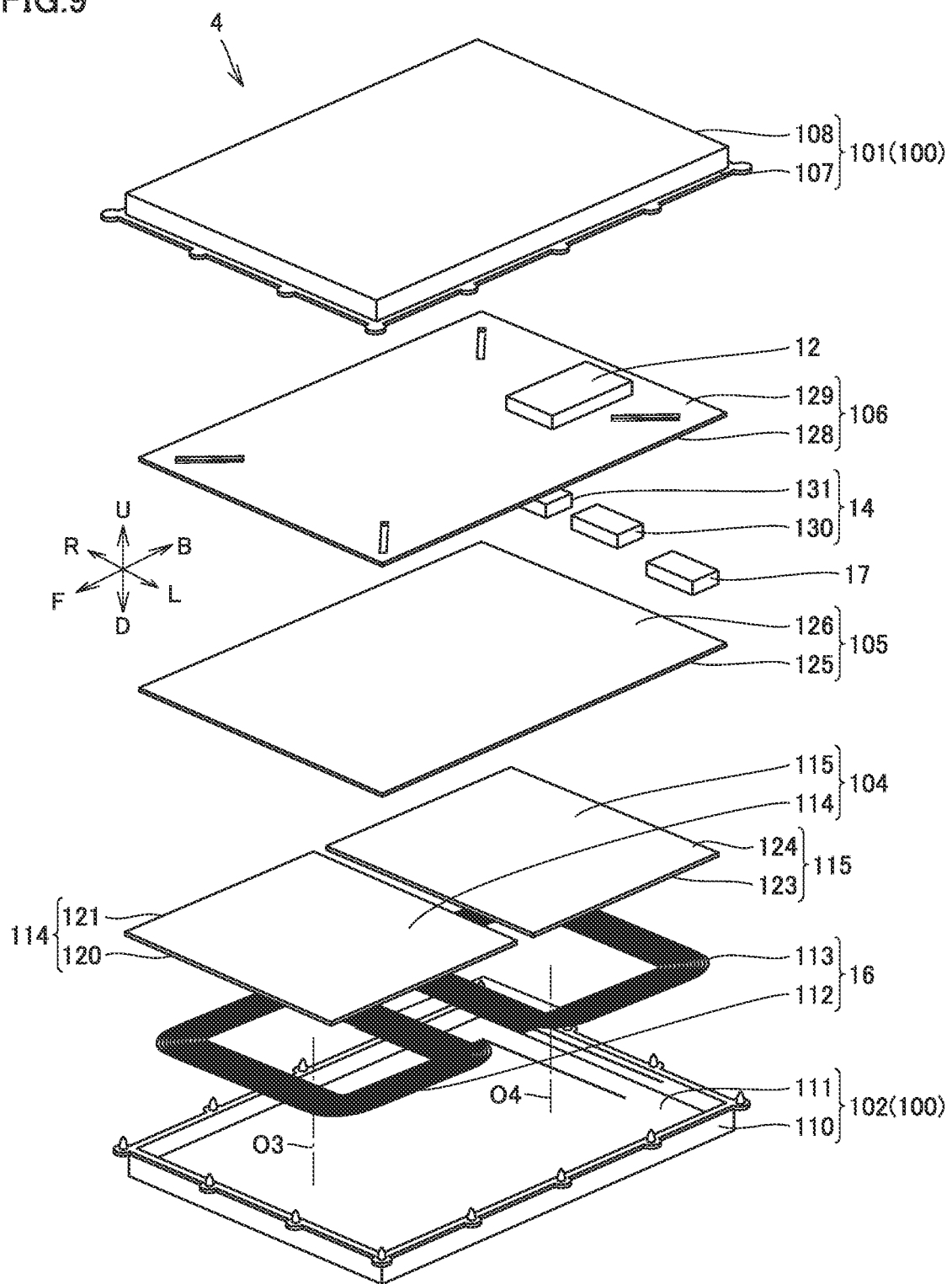
FIG. 9 is an exploded perspective view showing a power reception device 4.

Then, the configuration of power reception device 4 will be hereinafter described with reference to FIG. 9 and the like. FIG. 9 is an exploded perspective view showing power reception device 4.

Power reception device 4 includes a case 100, a power reception coil 16, a ferrite plate 104, a metal plate 105, a capacitor 11, a filter 14, a substrate 106, and a rectifier 12.

Power reception coil 16, ferrite plate 104, metal plats 105, filter 14, substrate 106, capacitor 17, and rectifier 12 are housed in case 100.

Case 100 includes an upper cover 101 and a lower cover 102. Upper cover 101 and lower cover 102 each are formed of resin.

Upper cover 101 includes an upper wall 108 and a side wall 107. Side wall 107 is formed so as to extend downward from the outer peripheral edge of upper wall 108.

Lower cover 102 includes a bottom wall 111 and a side wall 110. Side wall 110 is formed so as to extend upward from the outer peripheral edge of bottom wall 111.

Power reception coil 16 is disposed on the upper surface of bottom wall 111. Power reception coil 16 includes a third coil 112 and a fourth coil 113. Third coil 112 is formed so as to surround a winding axis O3 extending in the up-down direction. Fourth coil 113 is formed so as to surround a winding axis O4 extending in the up-down direction. Third coil 112 and fourth coil 113 are disposed so as to be arranged in the front-rear direction of vehicle 2.

Each of third coil 112 and fourth coil 113 is a spiral-shaped flat coil. Although third coil 112 and fourth coil 113 each are formed in an approximately rectangular shape, third coil 112 and fourth coil 113 each may be formed in various shapes.

Ferrite plate 104 is disposed on the upper surface side of power reception coil 16. Ferrite plate 104 includes a divided ferrite plate 114 and a divided ferrite plate 115.

Divided ferrite plate 114 and 115 are disposed so as to be arranged in the front-rear direction of vehicle 2. Divided ferrite plates 114 and 115 each are formed in a plate shape. Divided ferrite plate 114 include a lower surface 120 and an upper surface 121. Divided ferrite plate 115 includes a lower surface 123 and an upper surface 124.

Third coil 112 is disposed on lower surface 120 of divided ferrite plate 114. Fourth coil 113 is disposed on lower surface 123 of divided ferrite plate 115.

Metal plate 105 is disposed on the upper surface side of ferrite plate 104. Metal plate 105 is formed of a metal material such as aluminum or an aluminum alloy. Metal plate 105 is formed in a plate shape and includes a lower surface 125 and an upper surface 126.

Substrate 106 is disposed on the upper surface 126 side of metal plate 105. Substrate 106 is formed in a plate shape, and includes a lower surface 128 and an upper surface 129. Filter 14 and capacitor 17 are disposed on lower surface 128 of substrate 106. Filter 14 includes a capacitor 130 and a coil 131. Capacitor 130 and coil 131 are disposed on lower surface 128 of substrate 106. Rectifier 12 is disposed on upper surface 129 of substrate 106.

Upper cover 101 is disposed on the upper surface 129 side of substrate 106. Upper cover 101 is disposed on the lower surface of power storage device 5 shown in FIG. 1.

Figure 10:
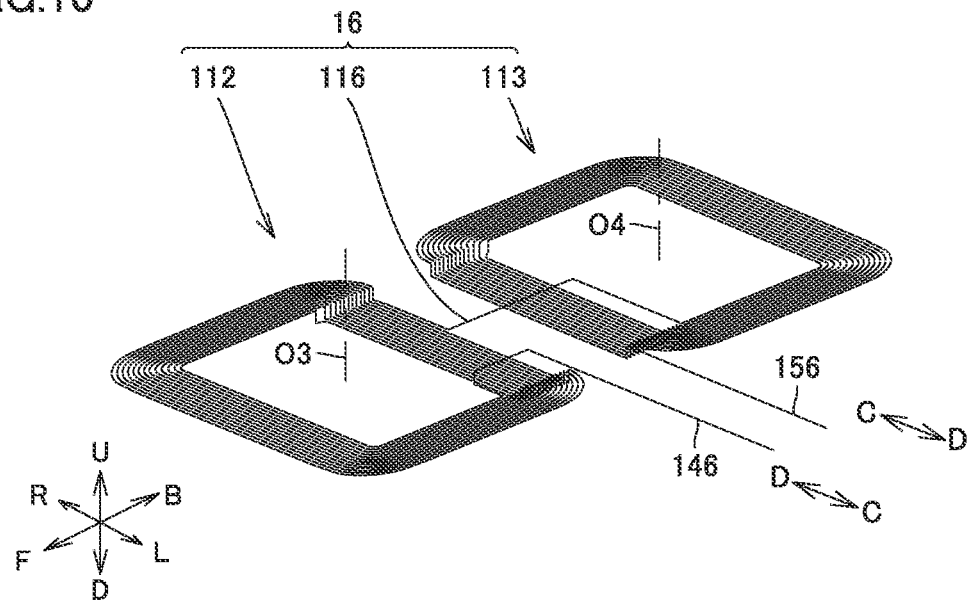
FIG. 10 is a perspective view schematically showing a power reception coil 16.

FIG. 10 is a perspective view schematically showing power reception coil 16. Power reception coil 16 includes a connection line 116 that connects third coil 112 and fourth coil 113.

Figure 11:
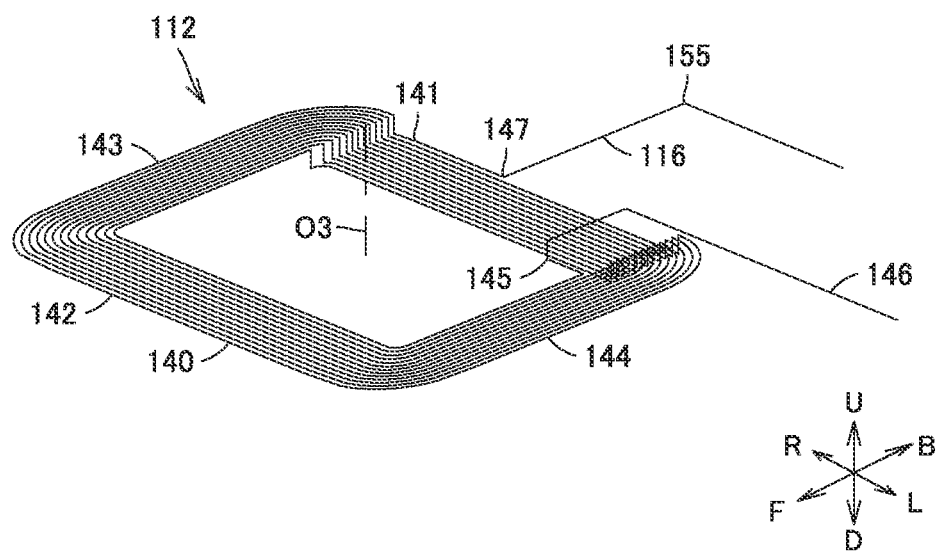
FIG. 11 is a perspective view schematically showing a third coil 112.

FIG. 11 is a perspective view schematically showing third coil 112. As shown in FIGS. 10 and 11, third coil 112 includes an adjacent portion 141, a spacer portion 142, a connection portion 143, a connection portion 144, an inner peripheral end 145, an outer peripheral end 147, and a lead line 146.

Adjacent portion 141 is located adjacent to fourth coil 113. Spacer portion 142 is located on the opposite side of adjacent portion 141 with respect to winding axis O3. Connection portion 143 connects one end of adjacent portion 141 and one end of spacer portion 142. Connection portion 144 connects the other end of adjacent portion 141 and the other end of spacer portion 142.

One end of adjacent portion 141 is formed so as to extend downward from the end of connection portion 143. The other end of adjacent portion 141 is formed so as to extend downward from the end of connection portion 144. Adjacent portion 141 is formed so as to extend from its one end toward its other end in a linear shape.

In an example shown in FIG. 11 and the like, adjacent portion 141 and spacer portion 142 are formed so as to extend in the right-left direction of the vehicle. Connection portions 143 and 144 are formed so as to extend in the front-rear direction of vehicle 2.

Adjacent portion 141 is located lower than spacer portion 142. Spacer portion 142 and connection portions 144 and 143 are disposed on lower surface 120 of divided ferrite plate 114.

Inner peripheral end 145 is located on the inner periphery of third coil 112. Outer peripheral end 14 is located on the outer periphery of third coil 112. Lead line 146 is connected to inner peripheral end 145, and pulled out to the outside from between adjacent portion 141 and divided ferrite plate 114. Connection line 116 is connected to outer peripheral end 147.

Third coil 112 configured as described above is formed by winding a coil wire 140 around winding axis O3. Specifically, third coil 112 is formed to be closer to winding axis O3 from outer peripheral end 147 toward inner peripheral end 145 every winding of coil wire 140.

Coil wire 140 is formed so as to extend in the direction of leftward rotation (in the counter-clockwise direction) around winding axis O3 from outer peripheral end 147 toward inner peripheral end 145.

Figure 12:
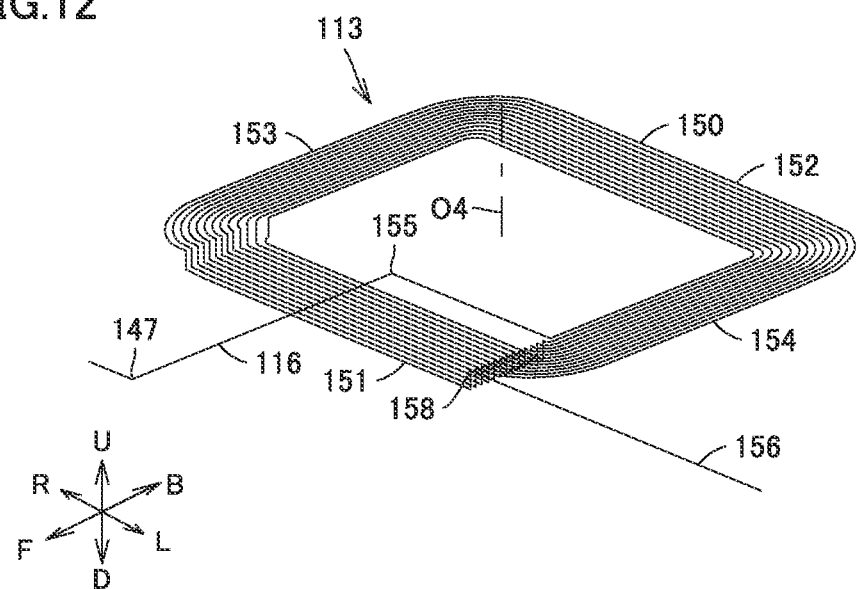
FIG. 12 is a perspective view schematically showing a fourth coil 113.

FIG. 12 is a perspective view schematically showing fourth coil 113. Fourth coil 113 includes an adjacent portion 151, a spacer portion 152, a connection portion 153, a connection portion 154, an inner peripheral end 155, an outer peripheral end 158, and a lead line 156.

Adjacent portion 151 is located adjacent to third coil 112. Specifically, adjacent portion 151 is located adjacent to adjacent portion 141 of third coil 112. Adjacent portion 151 is located on the opposite side of spacer portion 152 with respect to winding axis O4. Connection portion 153 connects one end of adjacent portion 151 and one end of spacer portion 152. Connection portion 153 connects the other end of adjacent portion 151 and the other end of spacer portion 152.

One end of adjacent portion 151 is formed so as to extend downward from the end of connection portion 153. The other end of adjacent portion 351 is formed so as to extend downward from the end of connection portion 154. Adjacent portion 151 is located lower than spacer portion 152.

Fourth coil 113 configured as described above is formed by winding a coil wire 150 so as to extend around winding axis O4 in the direction of rightward rotation (in the clockwise direction) from outer peripheral end 158 toward inner peripheral end 155.

Figure 13:
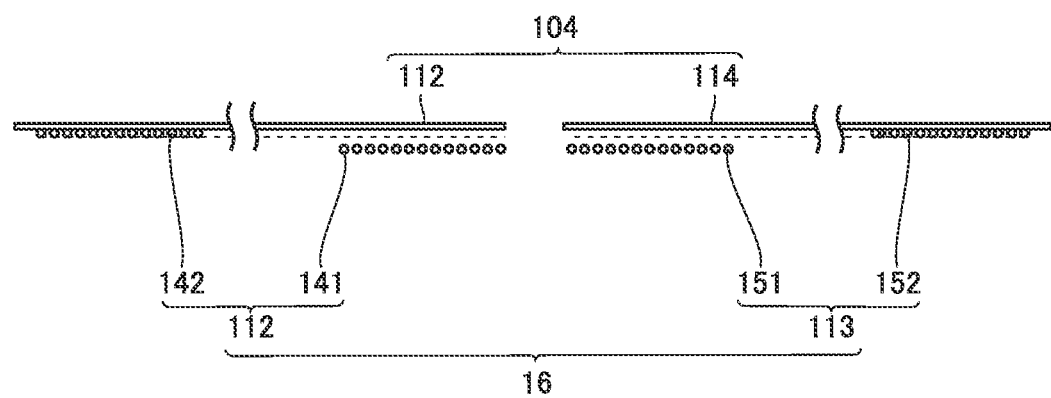
FIG. 13 is a cross-sectional view showing a power reception coil 16 and a ferrite plate 104.

FIG. 13 is a cross-sectional view showing a power reception coil 16 and a ferrite plate 104. In third coil 112, adjacent portion 141 is located lower than the lower end of spacer portion 142. In fourth coil 113, adjacent portion 151 is located lower than spacer portion 152.

When power reception device 4 configured as described above receives electric power from power transmission device 3, an AC current flows through power reception coil 16.

In FIG. 10, the total length, of the coil wire of third coil 112, the coil wire of fourth coil 113, and connection line 116 is about several meters to about a dozen or more meters.

On the other band, the frequency of the AC current received by power reception coil 16 is about several ten kHz to about one hundred and several ten kHz, and the wavelength of the current is about several hundred meters.

Accordingly, when a current flows through lead line 156 of fourth coil 113 in a current direction C, a current flows through lead line 146 of third coil 112 in current direction C.

In FIG. 12, when the current flows through lead line 156 in current direction C, the current direction in which the current flowing through fourth coil 113 winds around winding axis O4 (the fourth current direction) is the direction of rightward rotation (the counter-clockwise direction). Similarly, the current direction in which the current flowing through third coil 112 winds around winding axis O3 (the third current direction) is the direction of leftward rotation (the clockwise direction).

In this way, power reception coil 16 is also formed such that, during power reception, the current direction in which the current flows through third coil 112 (the third current direction) and the current direction in which the current flows through fourth coil 113 (the fourth current direction) are opposite to each other.

Figure 14:
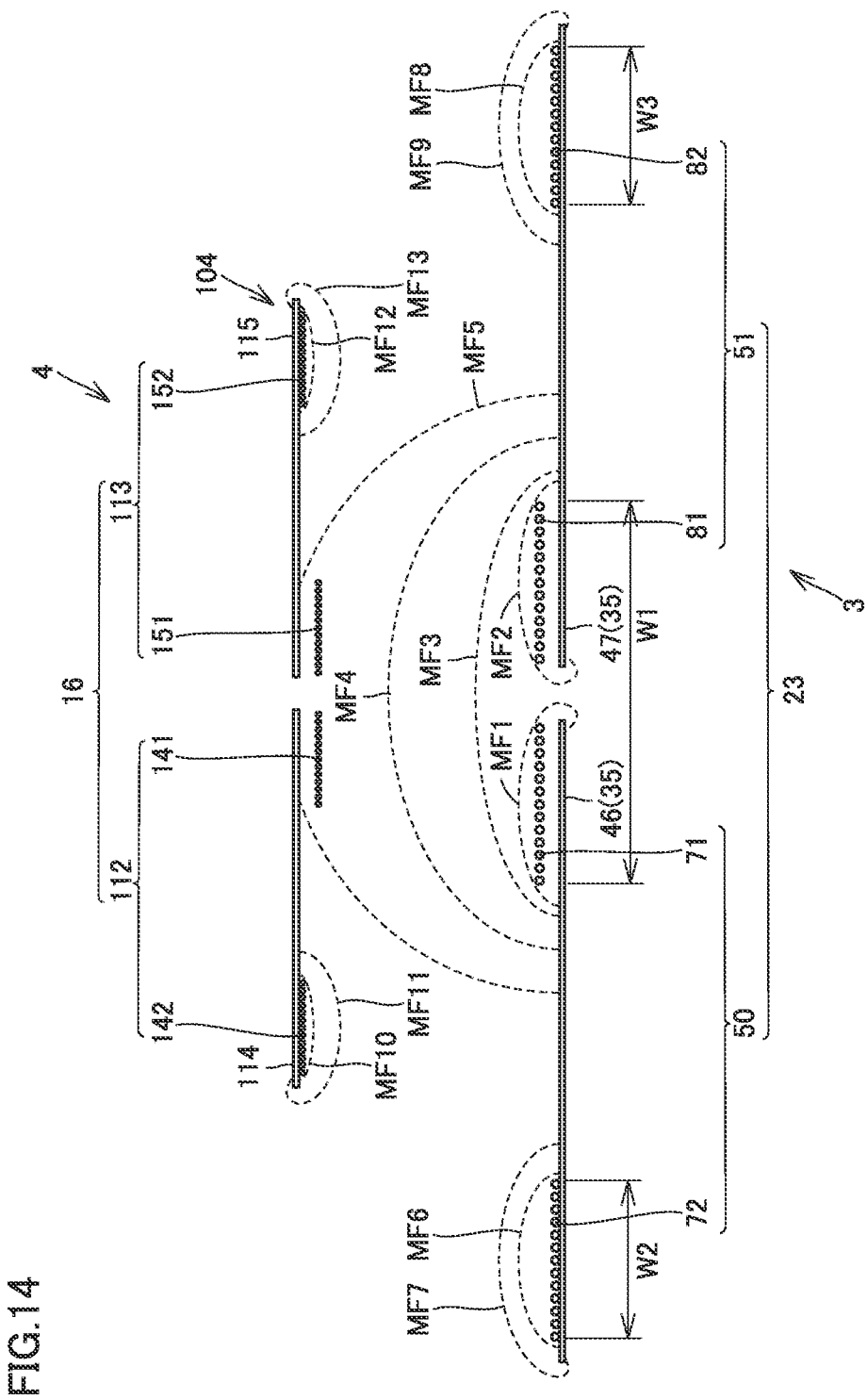
FIG. 14 is a cross-sectional view schematically showing the state at the time when electric power is transmitted from power transmission device 3 to power reception device 4.

FIG. 14 is a cross-sectional view schematically showing the state at the time when electric power is transmitted from power transmission device 3 to power reception device 4.

During power transmission, an AC current flows through power transmission coil 23. When the AC current flows through power transmission coil 23, a magnetic flux is formed around first coil 50 and second coil 51.

For example, a magnetic flux MF1 is formed in the vicinity of adjacent portion 71, and a magnetic flux MF6 and a magnetic flux MF7 are formed around spacer portion 72. A magnetic flux MF2 is formed in the vicinity around adjacent portion 81, and a magnetic flux MF8 and a magnetic flux MF9 are formed around spacer portion 82.

In this case, the current direction in which a current flows through first coil 50 and the current direction in which a current flows through second coil 51 are opposite to each other.

Accordingly, the magnetic flux formed around adjacent portion 71 and the magnetic flux formed around adjacent portion 81 are more likely to be coupled. Thus, a magnetic flux MF3 formed so as to extend over adjacent portion 71 and adjacent portion 81 is more likely to be formed.

In this ease, a width W1 between the inner peripheral edge of adjacent portion 71 and the inner peripheral edge of adjacent portion 81 is larger than a width W2 of spacer portion 72 or a width W3 of spacer portion 82.

Accordingly, the effective radius of the magnetic flux formed so as to extend over adjacent portion 71 and adjacent portion 81 is longer than the effective radius of the magnetic flux formed so as to surround each of spacer portions 72 and 82.

Thus, the magnetic flux formed so as to extend over adjacent portion 71 and adjacent portion 81 is more likely to be distributed so as to expand upward. Thus, magnetic fluxes such as magnetic flux MF4 and magnetic flux MF5 are more likely to be formed. Consequently, a magnetic flux such as magnetic flux MF5 interlinked with power reception coil 16 is more likely to be generated.

Particularly in power transmission device 3 according to the present first embodiment, adjacent portion 71 and adjacent portion 81 are located at higher positions. Consequently, the magnetic flux formed so as to extend over adjacent portion 71 and adjacent portion 81 is more likely to be distributed upward, and also, more likely to be interlinked with power reception coil 16.

Thus, in power transmission device 3 according to the present first embodiment the coupling coefficient between power transmission device 3 and power reception device 4 can be improved.

Adjacent portions 141 and 151 of power reception coil 16 are located lower than spacer portions 142 and 152. Accordingly, adjacent portions 141 and 151 are more likely to be interlinked with the magnetic flux formed so as to extend over adjacent portion 71 and adjacent portion 81. Also, in power transmission coil 23, width W2 of spacer portion 72 and width W3 of spacer portions 82 are small, so that magnetic fluxes MF6 and MF7 formed around spacer portion 72 are less likely to expand upward. Consequently, like magnetic fluxes MF6 and MF7, the magnetic flux formed around spacer portion 72 is formed so as to surround spacer portion 72. Similarly, the magnetic flux formed around spacer portion 82 is also formed so as to surround spacer portion 82.

When the magnetic flux from power transmission coil 23 is interlinked with power reception coil 16, an AC current flows through power reception coil 16. When the AC current flows through power reception coil 16, a magnetic flux is formed also around power reception coil 16.

Since adjacent portion 141 and adjacent portion 151 are arranged so as to be located adjacent to each other, a magnetic flux is formed so as to extend over adjacent portion 141 and adjacent portion 151. Furthermore, magnetic fluxes MF10 and MF11 are formed so as to surround spacer portion 142 while magnetic fluxes MF12 and MF13 are formed so as to surround spacer portion 152.

The distance between the inner peripheral edge of adjacent portion 141 and the inner peripheral edge of adjacent portion 151 is larger than the width of each of spacer portions 142 and 152. Thus, the magnetic flux formed so as to extend over adjacent portion 141 and adjacent portion 151 is more likely to expand downward so as to be interlinked with power transmission coil 23.

Particularly, since adjacent portions 141 and 151 are located, lower than spacer portions 142 and 152, the magnetic flux formed so as to extend over adjacent portions 141 and 151 is more likely to be interlinked with power transmission coil 23. Thereby, the coupling coefficient between power reception device 4 and power storage device 5 is improved.

In this way, according to power reception device 4 in the present first embodiment, the magnetic flux from power transmission device 3 is readily captured, so that the coupling coefficient between power transmission device 3 and power reception device 4 can be improved.

Figure 15:
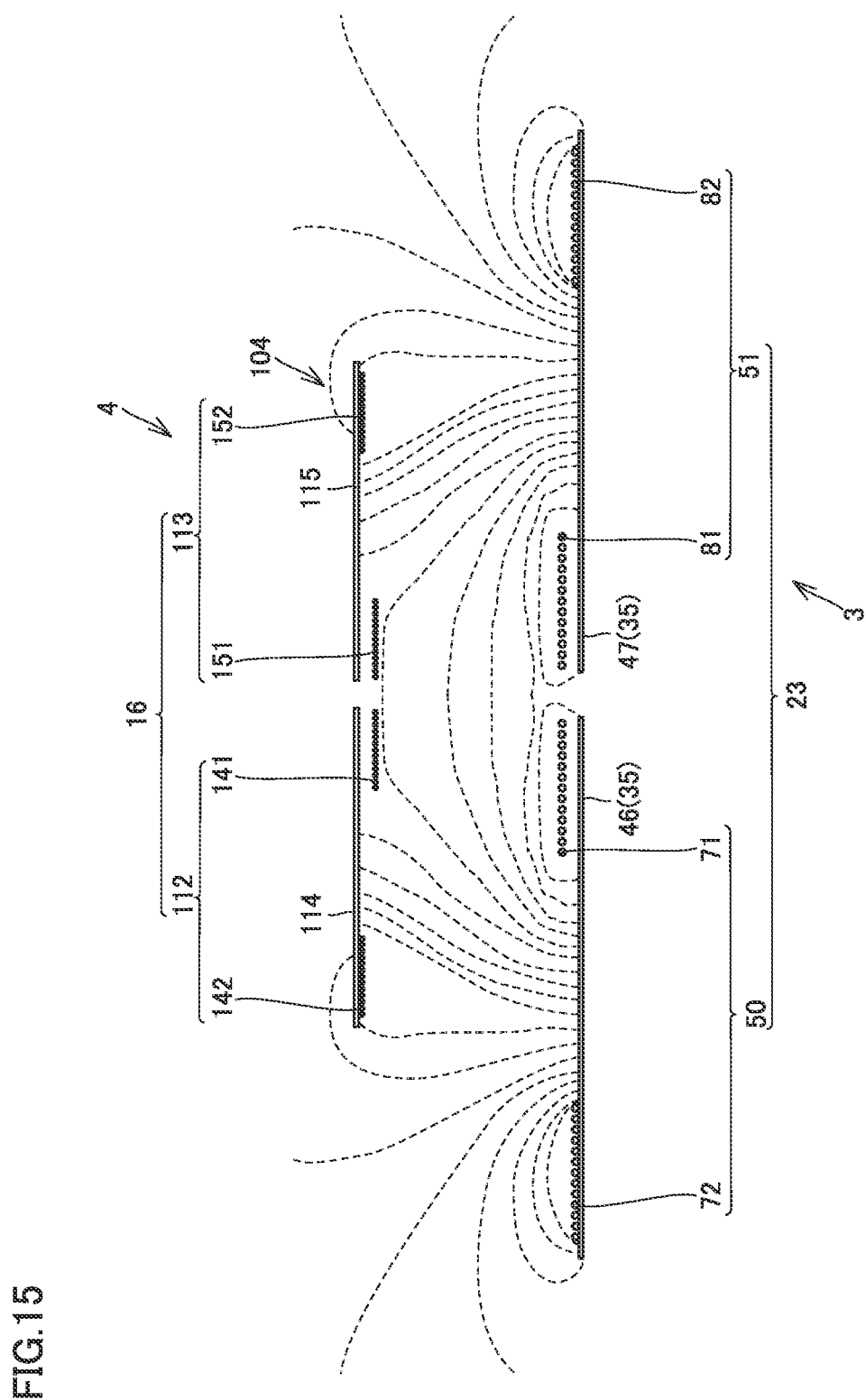
FIG. 15 is a simulation result showing a magnetic flux distribution in power transmission device 3 and power reception device 4 during transmission and reception of electric power.

FIG. 15 is a simulation result showing the magnetic flux distribution in power transmission device 3 and power reception device 4 during transmission and reception of electric power. In the simulation, electromagnetic field analysis software such as JMAG (registered trademark) was used. As apparent also from this FIG. 15, it turns out that many magnetic fluxes are interlinked between adjacent portions 71, 81 of power transmission coil 23 and adjacent portions 141, 151 of power reception coil 16.

Figure 16:
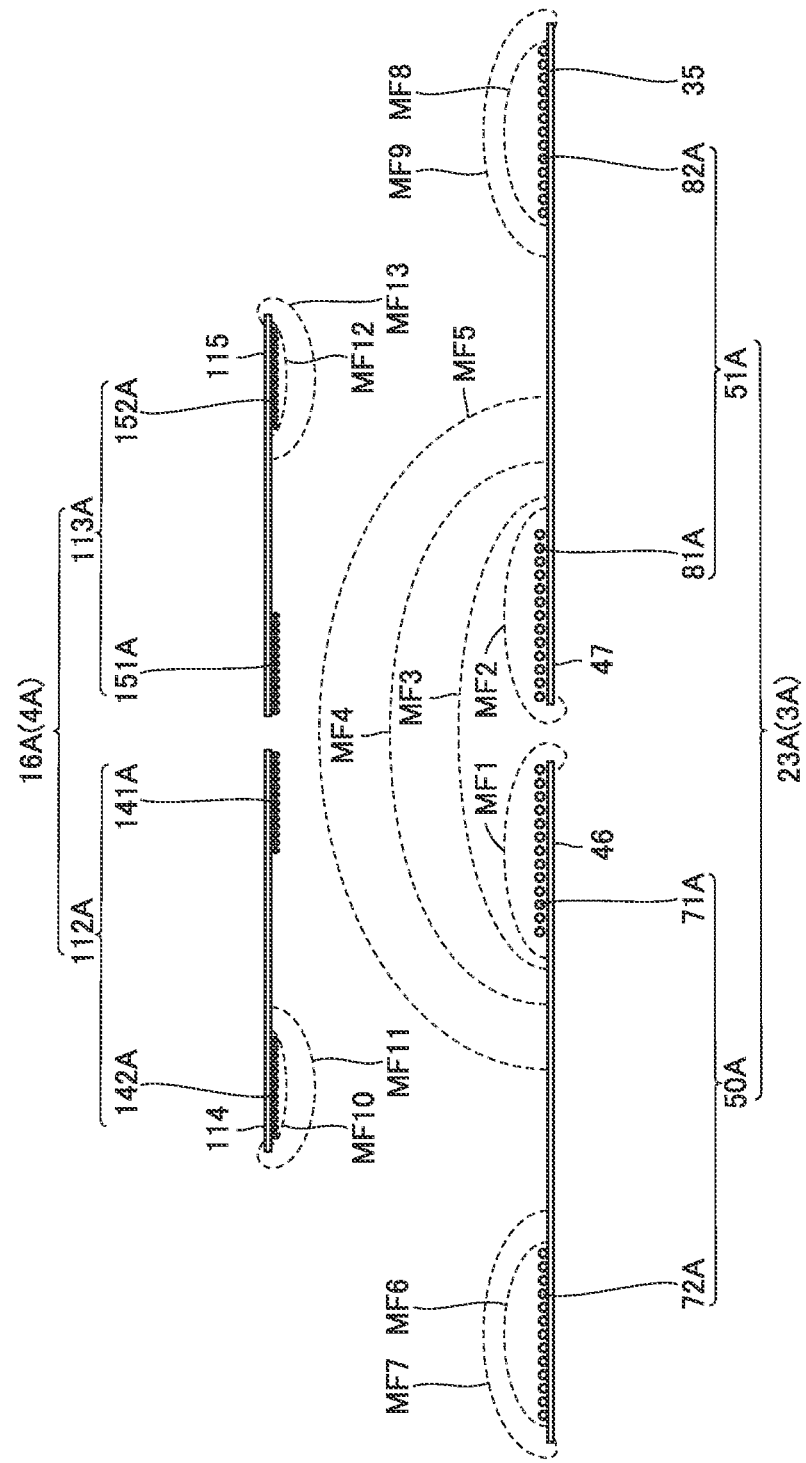
FIG. 16 is a cross-sectional view showing a power reception coil 16A and a power transmission coil 23A according to a comparative example.

FIG. 16 is a cross-sectional view showing a power reception coil 16A and a power transmission coil 23A according to a comparative example. Power transmission coil 23A includes a first coil 50A and a second coil 51A. First coil 50A includes an adjacent portion 71A and a spacer portion 72A that are located coplanar with each other. Second coil 51A includes an adjacent portion 81A and a spacer portion 82A that are located coplanar with each other.

Similarly, power reception coil 16A includes a third coil 112A and a fourth coil 113A. Third coil 112A includes a spacer portion 142A and an adjacent portion 141A that are located coplanar with each other.

Fourth coil 113A includes an adjacent portion 151A and a spacer portion 152A that are located coplanar with each other.

Also when electric power is transmitted to power reception coil 16A from power transmission coil 23A configured as described above, an AC current is supplied to power transmission coil 23A. Adjacent portions 71A and 81A are located lower than adjacent portions 71 and 81 shown in FIG. 14.

Accordingly, the magnetic flux formed around adjacent portions 71A and 81A is less likely to be interlinked with power reception coil 16A.

Similarly, adjacent portions 141A and 151A of power reception coil 16A are located higher than adjacent portions 141 and 151 of power reception coil 16. Accordingly, power reception coil 16A is less likely to capture the magnetic flux as compared with power reception coil 16.

In other words, it turns out that the coupling coefficient can be Improved more, in power transmission device 3 and power reception device 4 according to the present first embodiment than in power transmission device 3A and power reception device 4A according to the comparative example.

Since the coupling coefficient can be improved more in power transmission device 3 than in power transmission device 3A, power transmission coil 23 of power transmission device 3 can be formed smaller in size than power transmission coil 23A of power transmission device 3A. Thereby, power transmission device 3 can be formed smaller in structure size than power transmission device 3A.

Similarly, according to power reception device 4 in the present first embodiment, power reception coil 16 can be formed smaller in size than power reception coil 16A, so that power reception device 4 can be formed smaller in structure size than power reception device 4A.

Second Embodiment

Then, a power transmission device 3B and a power reception device 4B according to the second embodiment will be hereinafter described with reference to FIG. 17 and the like.

Figure 17:
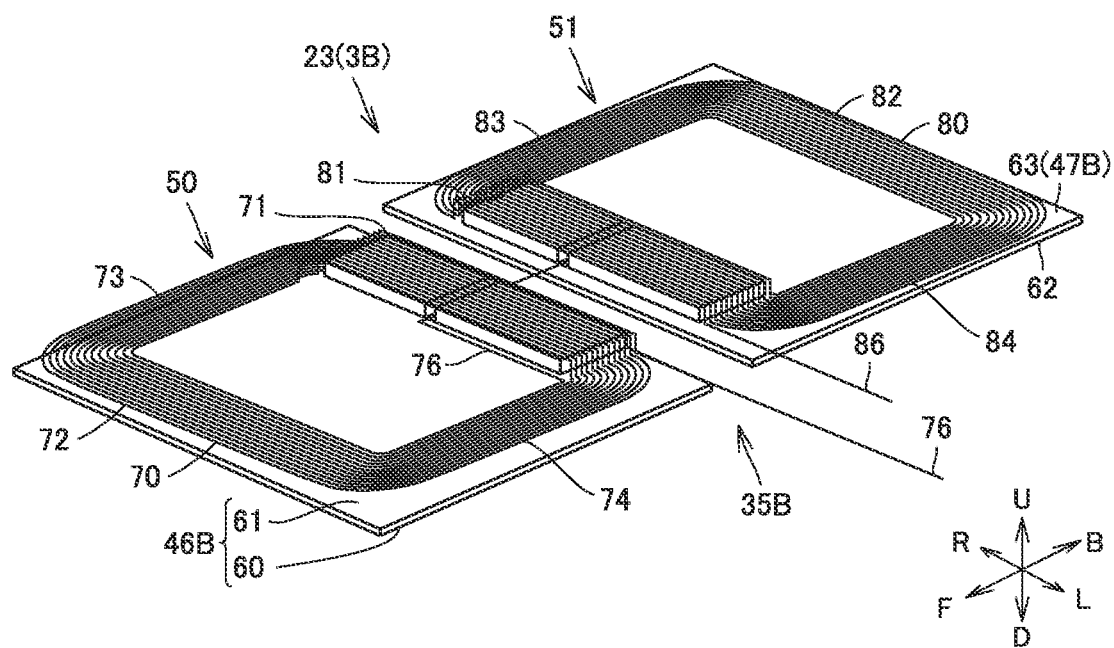
FIG. 17 is a perspective view showing a part of a power transmission device 3B according to the present second embodiment.

FIG. 17 is a perspective view showing a part of power transmission device 3B according to the present second embodiment. Power transmission device 3B includes a power transmission coil 23 and a ferrite plate 35B.

Power transmission coil 23 of power transmission device 3B according to the present second embodiment has the same shape as that of power transmission coil 23 in the first embodiment.

Figure 18:
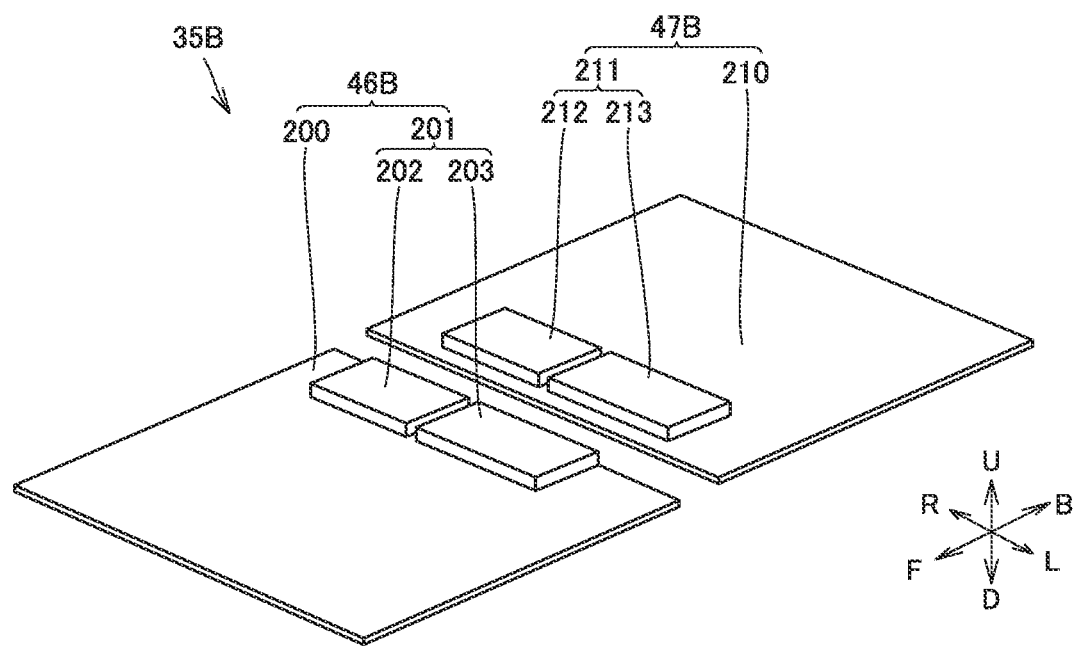
FIG. 18 is a perspective view schematically showing a ferrite plate 35B.

FIG. 18 is a perspective view schematically showing ferrite plate 35B. Ferrite plate 35B includes a divided ferrite plate 46B and a divided ferrite plate 47B. Divided ferrite plate 46B includes a plate portion 200 and a protruding portion 201. Plate portion 200 is formed in a plate shape.

Protruding portion 201 is formed on the upper surface of plate portion 200. Protruding portion 201 includes a divided protruding portion 202 and a divided protruding portion 203. Each of divided protruding portions 202 and 203 is formed so as to protrude upward from the upper surface of plate portion 200. There is a gap formed between divided protruding portion 202 and divided protruding portion 203.

As shown in FIGS. 17 and 18, first coil 50 is disposed on an upper surface 61 of ferrite plats 35B. Spacer portion 72 and connection portions 73 and 74 are disposed on the upper surface of plate portion 200. Adjacent portion 71 is disposed on the upper surface of protruding portion 201. Specifically, adjacent portion 71 is disposed on the upper surfaces of divided protruding portion 202 and divided protruding portion 203. Lead line 76 is disposed so as to extend through the gap between divided protruding portion 202 and divided protruding portion 203.

In divided ferrite plate 46B, a portion that faces spacer portion 72 (the first facing portion) is an upper surface of plate portion 200. In divided ferrite plate 40B, a portion that faces adjacent portion 71 (the second facing portion) is: divided protruding portion 202 and divided protruding portion 203; and a portion of plate portion 200 that is located between divided protruding portions 202 and 203.

As apparent also from FIG. 18 at least a part of the portion of divided ferrite plate 46B that faces adjacent portion 71 is formed thicker than the portion of divided ferrite plate 46B that faces spacer portion 72. Specifically, the portion of ferrite plate 35B on which protruding portion 201 is located is thicker than plate portion 200.

Second coil 51 is disposed on upper surface 63 of divided ferrite plate 47B. Divided ferrite plate 47B includes a plate portion 210 and a protruding portion 211. Plate portion 210 is formed in a plate shape. Protruding portion 211 is formed on the upper surface of plate portion 210. Protruding portion 211 includes a divided protruding portion 212 and a divided protruding portion 213. There is a gap formed also between divided protruding portion 212 and divided protruding portion 213. A connection line 53 is disposed so as to pass through this gap.

Adjacent portion 81 is disposed on the upper surface of protruding portion 211. Specifically, adjacent portion 81 is disposed on the upper surface ox protruding portion 211. Also, spacer portion 82 and connection portions 83 and 84 are disposed on the upper surface of plate portion 210.

As apparent also from FIG. 18, at least a part of the portion of divided ferrite plate 47B that faces adjacent portion 81 is formed thicker than the portion of divided ferrite plate 47B that faces spacer portion 82.

Figure 19:
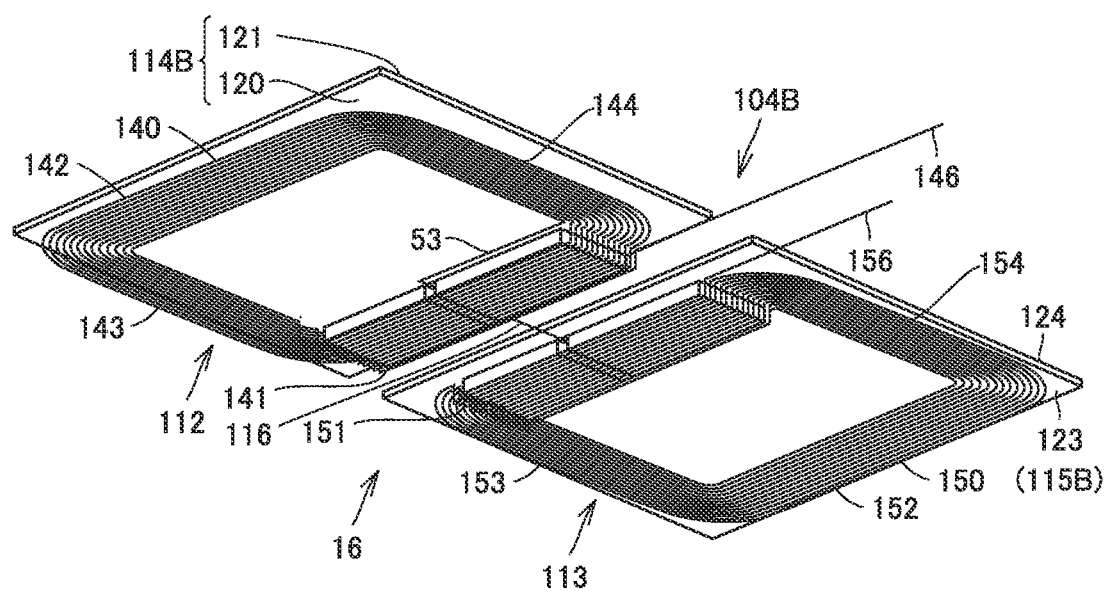
FIG. 19 is a perspective view showing a power reception coil 16 and a ferrite plate in a power reception device 4B.
Figure 20:
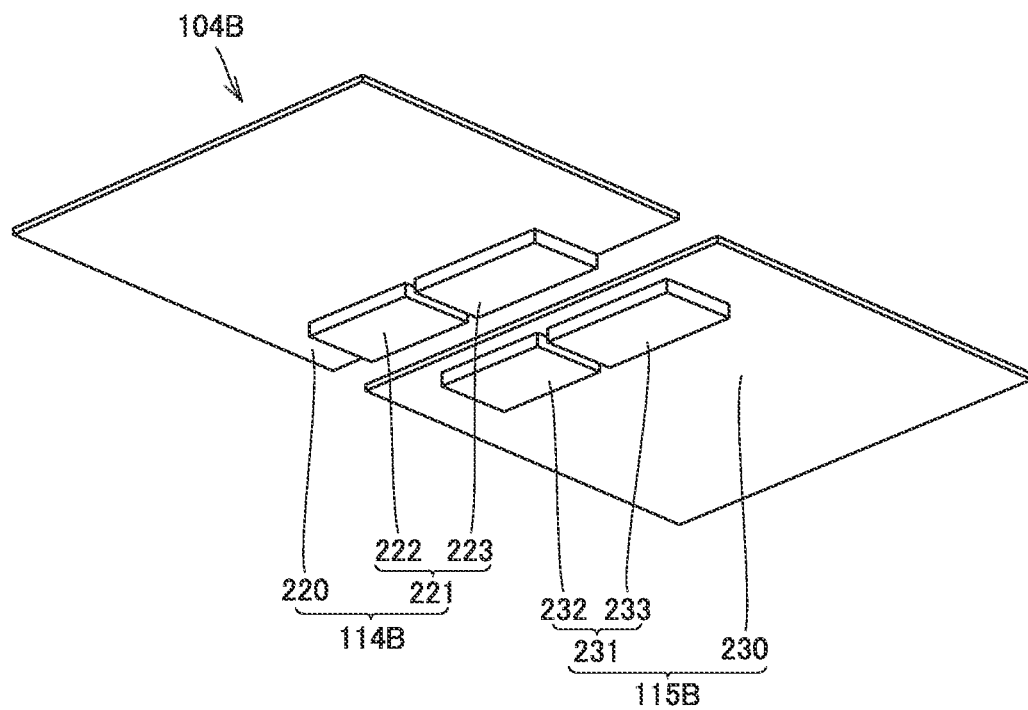
FIG. 20 is a perspective view schematically showing a ferrite plate 104B.

FIG. 19 is a perspective view showing a power reception coil 16 and a ferrite plate 104B in power reception device 4B. FIG. 20 is a perspective view schematically showing ferrite plate 104B. Ferrite plate 104B includes a divided ferrite plate 114B and a divided ferrite plate 115B.

Divided ferrite plate 114B includes a plate portion 220 and a protruding portion 221. Protruding portion 221 is formed on the lower surface of plate portion 220. Protruding portion 221 includes a divided protruding portion 222 and a divided protruding portion 223. Between divided protruding portion 222 and divided protruding portion 223, there is a gap through which connection line 116 is disposed.

Adjacent portion 141 of third coil 112 is disposed on the lower surface of protruding portion 221. Spacer portion 142 and connection portions 143 and 144 are disposed on the lower surface of plate portion 220.

As apparent from FIG. 20, at least a part of the portion of divided ferrite plate 1148 that faces adjacent portion 141 is thicker than the portion of divided ferrite plate 114B that races spacer portion 142.

Divided ferrite plate 115B includes a plate portion 230 and a protruding portion 231. Protruding portion 231 is formed on the lower surface of plate portion 230 so as to protrude downward from the lower surface of plate portion 230.

Protruding portion 231 includes a divided protruding portion 232 and a divided protruding portion 233. Between divided protruding portion 232 and divided protruding portion 233, there is a gap through which connection line 116 passes.

Adjacent portion 151 of fourth coil 113 is disposed on the lower surface of protruding portion 231. Spacer portion 152 and connection portions 153 and 154 are disposed on the lower surface of plate portion 230.

At least a part of the portion of divided ferrite plate 115B that faces adjacent portion 151 is thicker than the portion of di vided ferrite plate 115B that faces spacer portion 152.

Figure 21:
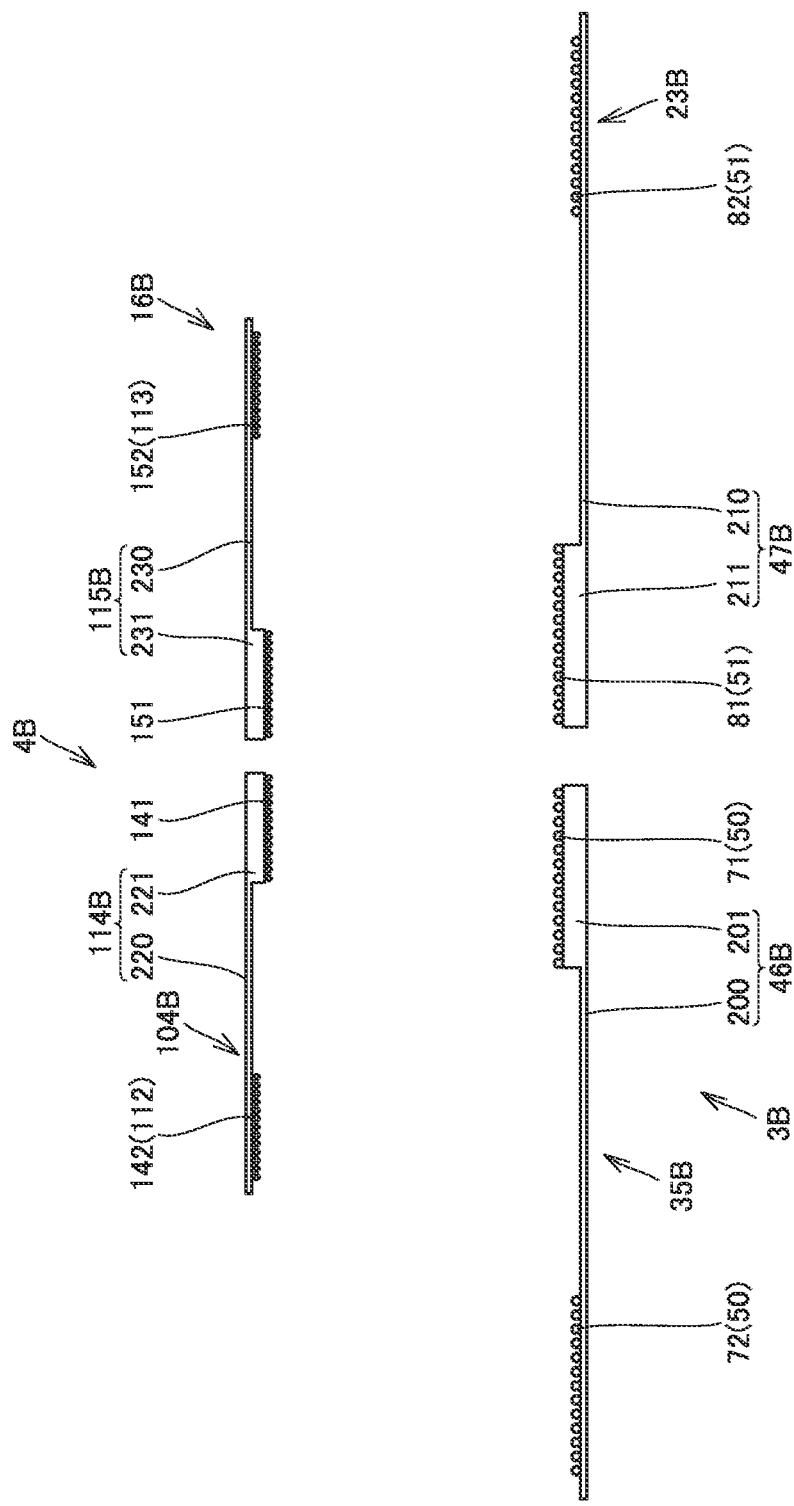
FIG. 21 is a cross-sectional view schematically showing the state where electric power is transmitted from power transmission device 3B to power reception device 4B.

FIG. 21 is a cross-sectional view schematically showing the state where electric power is transmitted from power transmission device 3B to power reception device 4B. The magnetic flux formed around, adjacent portion 71 and the magnetic flux formed around adjacent portion 81 are more likely to be coupled with each other. Thus, the most, part of the magnetic flux formed around adjacent portion 71 by a current flowing through adjacent portion 71 and the most part of the magnetic flux formed around adjacent portion 81 by a current flowing through adjacent portion 81 are formed so as to extend over adjacent portion 71 and adjacent portion 81.

The amount of the magnetic flux flowing so as to extend over adjacent portion 71 and adjacent portion 81 is greater than the amount of the magnetic flux formed around spacer portion 72. Similarly, the amount of the magnetic flux flowing so as to extend over adjacent portion 71 and adjacent portion 81 is greater than the amount of the magnetic flux formed around spacer portion 82.

The magnetic flux flowing so as to extend over adjacent portion 71 and adjacent portion 81 flows through the portion of ferrite plate 35B that faces adjacent portions 71 and 81. Furthermore, the magnetic flux flowing so as to surround only adjacent portion 71 also flows through the portion of ferrite plate 35B that faces adjacent portion 71. The magnetic flux flowing so as to surround only adjacent portion 81 also flows through the portion of ferrite plate 35B that faces adjacent portion 81.

The magnetic flux formed around each of spacer portions 72 and 82 flows through the portion of ferrite plate 35B that faces each of spacer portions 72 and 82.

Thus, the amount of the magnetic flux flowing through the portion of ferrite plate 35B that faces each of adjacent portions 71 and 81 is greater than the amount of the magnetic flux flowing through the portion of ferrite plate 35B that faces each of spacer portions 72 and 82.

In power transmission device 3B according to the present second embodiment, the portion of ferrite plate 35B that faces each of adjacent portions 71 and 81 is thicker than the portion of ferrite plate 35B that faces each of spacer portions 72 and 82.

Thus, local temperature rise Inside ferrite plate 35B can be suppressed.

In power transmission device 3A of the comparative example shown in FIG. 16, ferrite plate 35 is formed in a plate shape. Accordingly, the portion of ferrite plate 35 that feces each of adjacent portions 71A and 81A is identical in thickness to the portion of ferrite plate 35 that faces each of spacer portions 72A and 82A.

On the other hand, the amount of the magnetic flux flowing through the portion of ferrite plate 35 that faces each of adjacent portions 71A and 81A is greater than the amount of the magnetic flux flowing through the portion of ferrite plate 35 that faces each of spacer portions 72A and 82A.

Accordingly, the portion of ferrite plate 35 that feces each of adjacent portions 71A and 81A is higher in temperature than the portion of ferrite plate 35 that faces each of spacer portions 72A and 82A.

Consequently, the portion of ferrite plate 35 that faces each of adjacent portions 71A and 81A expands more than the portion of ferrite plate 35 that faces each of spacer portions 72A and 82A. Consequently, thermal stress occurs in the portion of fertile plate 35 that feces each of adjacent portions 71 and 81.

Generally, as the internal stress Inside ferrite increases, the magnetic resistance increases. As the magnetic resistance increases, the amount of heat generated upon passage of a magnetic flux also increases.

Thus, the portion of ferrite plate 35 that feces each of adjacent portions 71A and 81A is more likely to be increased in temperature.

On the other hand, in power transmission device 3B according to the present second embodiment, the adverse effect as described above can be suppressed.

In FIG. 21, power reception device 4B receives electric power from power transmission device 3B. In this case, an AC current occurs in power reception coil 16, and a magnetic flux is formed around power reception coil 16.

Also in power reception coil 16, the most part of the magnetic flux formed around adjacent portion 141 and the most part of the magnetic flux formed around adjacent portion 151 join together, and then, flow so as to extend over adjacent portion 141 and adjacent portion 151.

The amount of the magnetic flux flowing so as to extend over adjacent portion 141 and adjacent portion 151 is greater than the amount of the magnetic flux formed around each of spacer portions 142 and 152.

Accordingly, the amount of the magnetic flux flowing through the portion of ferrite plate 104B that faces each of adjacent portions 141 and 151 is greater than the amount of the magnetic flux flowing through the portion of ferrite plate 104B that faces each of spacer portions 142 and 152. The portion of ferrite plate 104B that faces each of adjacent portions 141 and 151 is thicker than, the portion of ferrite plate 104B that faces each of spacer portions 142 and 152.

Thus, local temperature rise in ferrite plate 104B can also be suppressed.

In the above-described first embodiment, ferrite plate 35 is divided into divided ferrite plates 46 and 47. In the above-described second embodiment, ferrite plate 35B is divided into divided ferrite plates 46B and 47B. However, divided ferrite plates 46 and 47 may be integrally formed, and also, divided ferrite plates 46B and 47B may be integrally formed.

Figure 22:
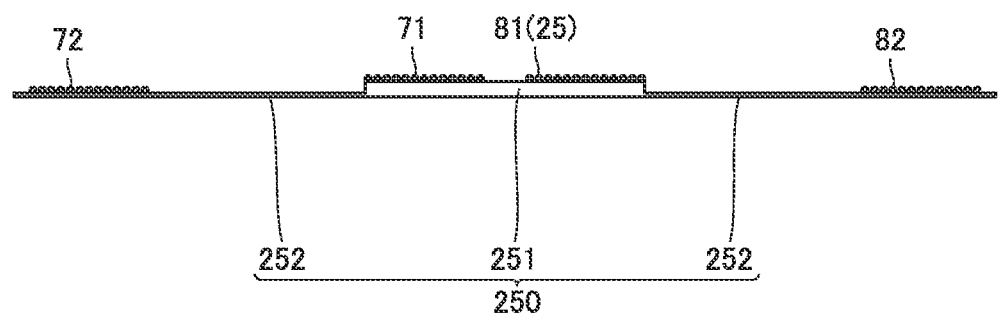
FIG. 22 is a cross-sectional view showing the first modification of the ferrite plate.

FIG. 22 is a cross-sectional view showing the first modification of the ferrite plate. A ferrite plate 250 includes a plate portion 252 and a protruding portion 251. Adjacent portions 71 and 81 of power transmission coil 23 are disposed on the upper surface of protruding portion 251.

In this ferrite plate 250, it becomes possible to reduce the distance by which the magnetic flux flowing so as to extend over adjacent portions 71 and 81 passes through the air. Thus, the amount of the magnetic flux flowing so as to extend over adjacent portions 71 and 81 can be increased. Thereby, the coupling coefficient between power reception device 4 and power transmission device 3 can be improved.

The configuration of ferrite plate 250 is applicable also to the ferrite plate of power reception device 4.

Figure 23:
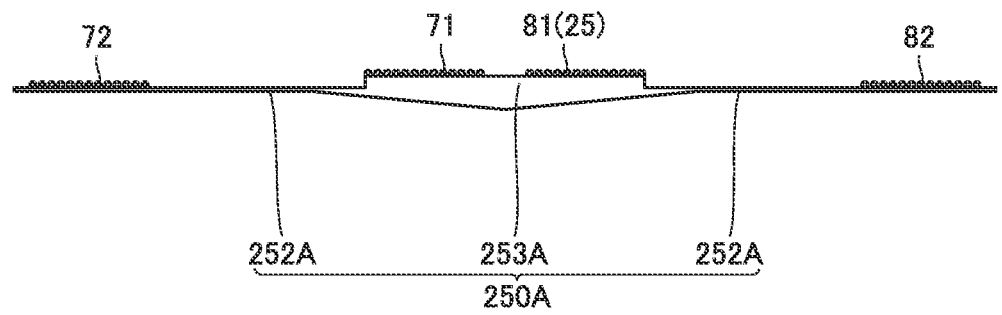
FIG. 23 is a cross-sectional view showing the second modification of the ferrite plate.

FIG. 23 is a cross-sectional view showing the second modification of the ferrite plate. Ferrite plate 250A includes a plate portion 252A and a protruding portion 253A. Protruding portion 253A is formed so as to protrude upward from the upper surface of plate portion 252A and also protrude downward.

Furthermore, protruding portion 253A is formed so as to be increased in thickness toward the center portion of protruding portion 253A in the width direction.

During power transmission, a large amount of magnetic flux flows through protruding portion 253A. Particularly in this case, the largest amount of magnetic flux flows through the center portion of protruding portion 253A.

When ferrite plate 250A is formed so as to be increased in thickness of the center portion of protruding portion 253A in the width direction, local temperature rise also inside protruding portion 253A can be suppressed.

Third Embodiment

Figure 24:
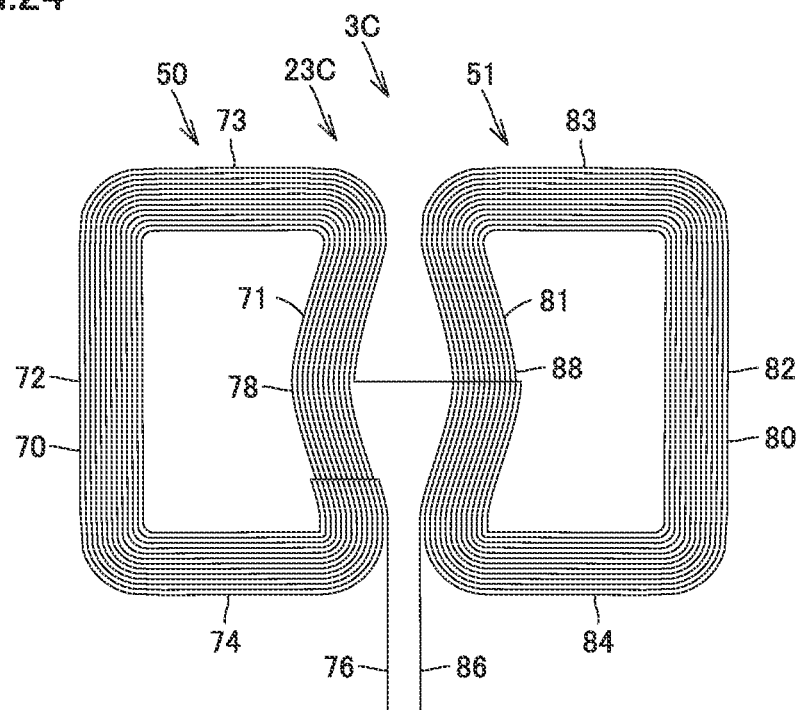
FIG. 24 is a plan view showing a power transmission coil 23C of a power transmission device 3C.

Referring to FIG. 24 and the like, a power transmission device 3C and a power reception device 4C according to the present third embodiment will be hereinafter described.

Figure 25:
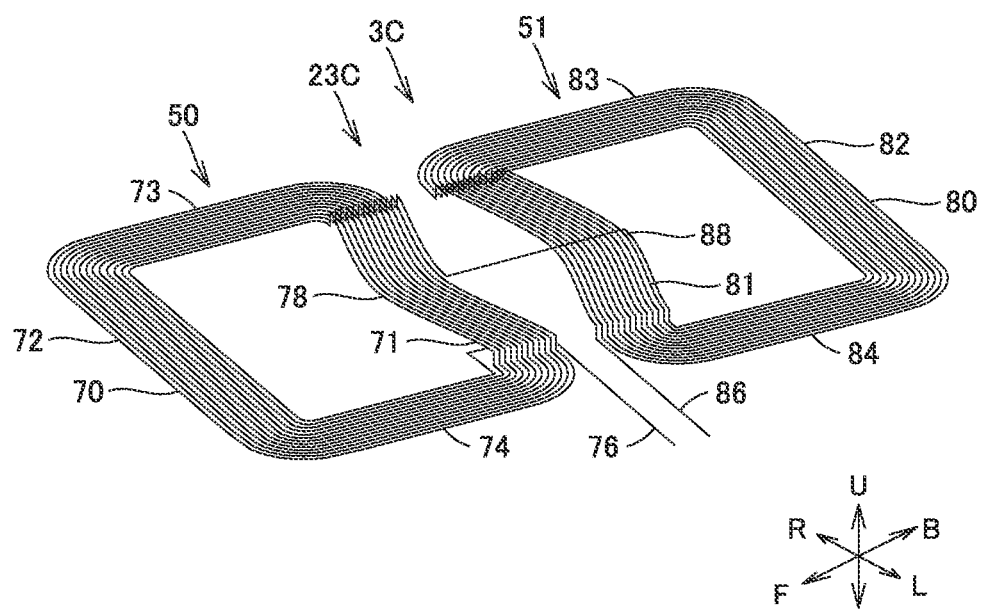
FIG. 25 is a perspective view showing power transmission coil 23C of power transmission device 3C.

FIG. 24 is a plan view showing a power transmission coil 23C of power transmission device 3C. FIG. 25 is a perspective view showing power transmission coil 23C of power transmission device 3C. Power transmission coil 23C includes a first coil 50 and a second coil 51. First coil 50 includes an adjacent portion 71, a spacer portion 72, and connection portions 73 and 74.

Adjacent portion 71 includes a recess portion 78. Recess portion 78 is formed so as to be away from adjacent portion 81 of second coil 51.

Recess portion 78 is formed in the center portion of adjacent portion 71 in the direction in which adjacent portion 71 extends. In examples shown in FIGS. 24 and 25, adjacent portion 71 is formed so as to be away from second coil 51 from the end of adjacent portion 71 toward the center portion thereof.

Adjacent portion 81 of second coil 51 also includes a recess portion 88. Recess portion 88 is formed so as to be away from first coil 50. Recess portion 88 is formed in the center portion of adjacent portion 81 in the direction in which adjacent portion 81 extends.

In the examples shown in FIGS. 24 and 25, adjacent portion 81 is formed so as to be away from first coil 50 from the end of adjacent portion 81 toward the center portion thereof. Recess portion 88 and recess portion 78 are formed so as to face each other.

Figure 26:
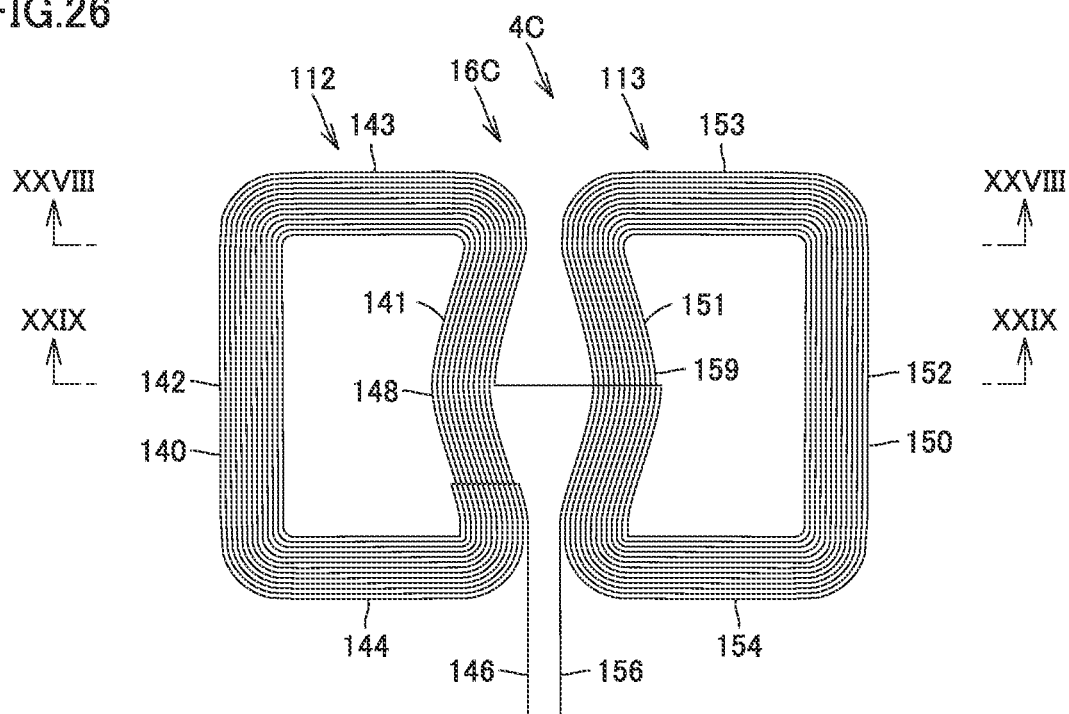
FIG. 26 is a plan view showing a power reception coil 16C of a power reception device 4C.
Figure 27:
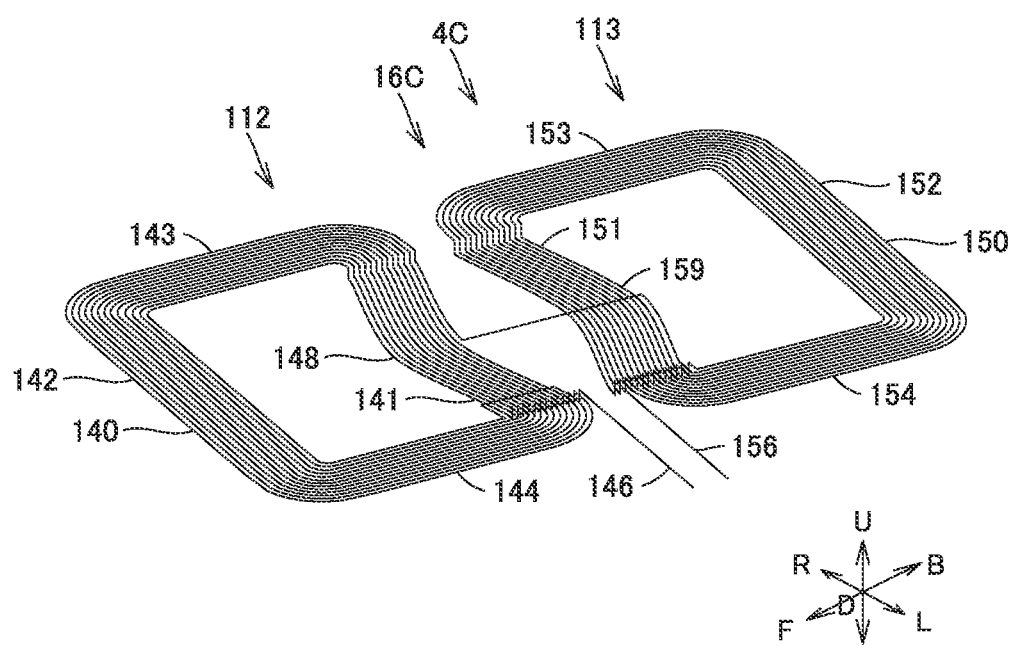
FIG. 27 is a perspective view showing power reception coil 160 of power reception device 4C.

FIG. 26 is a plan view showing a power reception coil 16C of a power reception device 4C. FIG. 27 is a perspective view showing power reception coil 16C of power reception device 4C.

In FIGS. 26 and 27, third coil 112 includes an adjacent portion 141. Adjacent portion 141 includes a recess portion 148. Recess portion 148 is formed so as to be away from adjacent portion 151 of fourth coil 113.

Recess portion 148 is formed in the center portion of adjacent portion 141 in the direction in which adjacent portion 141 extends. From the end of adjacent portion 141 toward the center portion thereof; adjacent portion 141 is formed so as to be away from fourth coil 113.

Fourth coil 113 includes an adjacent portion 151. Adjacent portion 151 includes a recess portion 159. Recess portion 159 is formed so as to be away from adjacent portion 141 of third coil 112. Recess portion 159 is formed in the center portion of adjacent portion 151 in the direction in which adjacent portion 151 extends. From the end of adjacent portion 151 toward the center portion thereof, adjacent portion 151 is formed so as to be away from adjacent portion 141. Recess portion 148 and recess portion 159 are formed so as to face each other.

Figure 28:
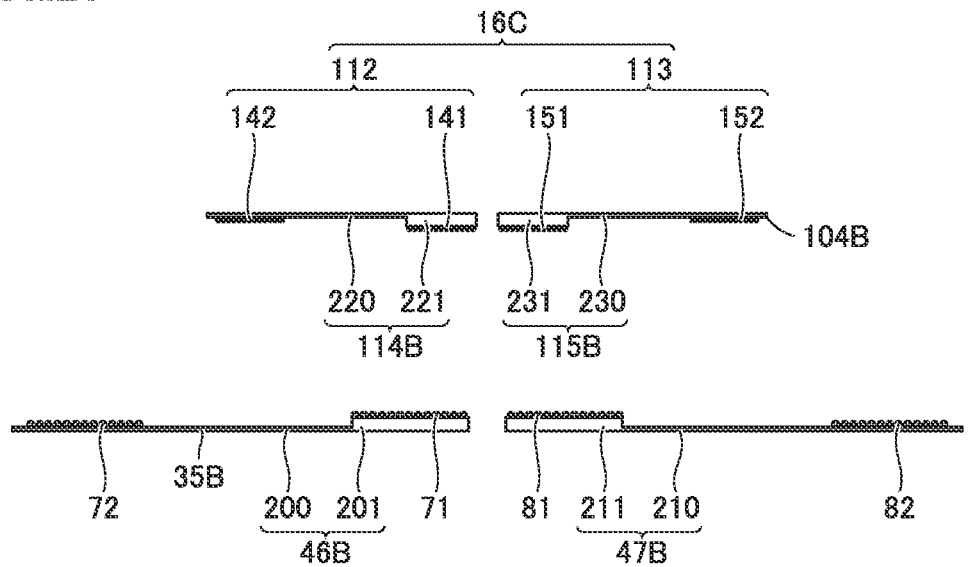
FIG. 28 is a cross-sectional view taken along a line XXVIII-XXVIII in FIG. 26.
Figure 29:
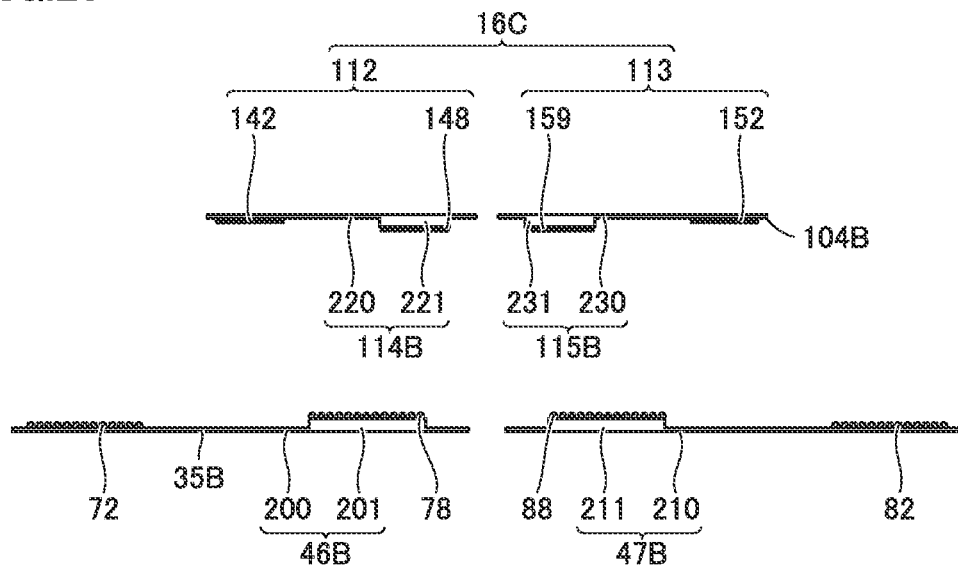
FIG. 29 is a cross-sectional view taken along a line XXIX-XXIX in FIG. 26.

FIG. 28 is a cross-sectional view taken along a line XXVIII-XXVIII in FIG. 26. FIG. 29 is a cross-sectional view taken along a line XXIX-XXIX in FIG. 26.

As shown in FIGS. 28 and 29, power transmission device 3C and power reception device 4C according to the present third embodiment include a ferrite plate 35B and a ferrite plate 104B, respectively, according to the second embodiment. Then, as shown in FIGS. 28 and 29, the distance between adjacent portion 71 and adjacent portion 81 becomes longest between recess portion 78 and recess portion 88.

Thus, it becomes possible to reduce the amount of the magnetic flux that flows through the portion of ferrite plate 35B that faces each of recess portion 78 and recess portion 88, so that temperature rise in protruding portions 201 and 211 can be suppressed.

The distance between adjacent portion 141 and adjacent portion 151 becomes longest between recess portion 148 and recess portion 159. Accordingly, the amount of the magnetic flux flowing so as to extend over recess portion 148 and recess portion 159 can be reduced.

Consequently, it becomes possible to suppress an increase in amount of the magnetic flux that flows through the portion of ferrite plate 104B that faces recess portion 148 and recess portion 159, so that temperature rise in protruding portions 221 and 231 can be suppressed. Also in the present third embodiment, in the state where power reception device 4C and power transmission device 3C face each other, recess portions 148 and 159 face recess portions 78 and 88, respectively, in the up-down direction. Thereby, it becomes possible to suppress an excessive increase in amount of the magnetic flux flowing through recess portions 148 and 159 and also through recess portions 78 and 88. Thus, for example, it becomes possible to suppress an increase in difference between the coupling coefficient (Kmax) at the time when power transmission device 3C and power reception device 4C are misaligned from each other in the front-rear direction or in the right-left direction; and the coupling coefficient at the time when power reception device 4C and power transmission device 3C face each other.

In the above-described third embodiment, as shown in FIGS. 28 and 29, in power transmission device 3C, it is not indispensable to employ a ferrite plate having protruding portions 201 and 211 formed thereon, but a plate-shaped ferrite plate not having protruding portions 201 and 211 formed thereon may be employed. Also, a protruding portion 253 having an upward ridge shape shown in FIG. 23 may be formed on a plate-shaped ferrite plate. Similarly, in power reception device 4C, it is not indispensable to employ ferrite plate 104B having protruding portions 221 and 231 formed thereon, but a plate-shaped ferrite plate not having protruding portions 221 and 231 formed thereon may be employed. Also, a protruding portion having an upward ridge shape may be formed on the upper surface side of a plate-shaped ferrite plate.

The present first to third embodiments have been described above. In the above-described first to third embodiments, an explanation has been given with regard to an example in which first coil 50 and second coil 51 are connected in series in power transmission coil 23, but first coil 50 may be connected to filter 24 and capacitor 22 while second coil 51 may be connected to filter 24 and capacitor 22.

Even when each of first coil 50 and second coil 51 is connected as described above, the current direction in which the current flows through first coil 50 and the current direction in which the current flows through second coil 51 become opposite to each other during power transmission.

Also in power reception coil 16, third coil 112 may be connected to rectifier 12 and capacitor 17 while fourth coil 113 may be connected to rectifier 12 and capacitor 17.

In the above-described first to third embodiments, power transmission coil 23 includes adjacent portion 71 and adjacent portion 81. Also, adjacent portion 71 and adjacent portion 81 each are located higher than spacer portion 72 and spacer portion 82. On the other hand, at least one of adjacent portions 71 and 81 may be located higher than spacer portions 72 and 82.

Similarly, also in power reception, coil 16, at least one of adjacent portions 141 and 151 may be located lower than spacer portions 142 and 152.

In the above-described first to third embodiments, third coil 112 and fourth coil 113 are disposed so as to be arranged in the front-rear direction of vehicle 2. On the other hand, third coil 112 and fourth coil 113 may be disposed so as to be arranged in the width direction of vehicle 2. Similarly, in the above-described first to third embodiments, first coil 50 and second coil 51 are disposed so as to be arranged in the front-rear direction of vehicle 2 that is stopped. On the other hand, first coil 50 and second coil 51 may be disposed so as to be arranged in the width direction of vehicle 2 that is stopped.

Although the embodiments of the present disclosure have been described as above, it should be understood that the embodiments disclosed herein are illustrative and non-restrictive in every respect. The scope of the present disclosure is defined by the terms of the claims, and is intended to include any modifications within the meaning and scope equivalent to the terms of the claims.

What is claimed is:

1. A power transmission device comprising:
a first coil formed so as to surround a first winding axis extending in an up-down direction;
a second coil formed so as to surround a second winding axis extending in the up-down direction; and
a ferrite plate on which the first coil and the second coil are disposed,
the first coil and the second coil being configured such that a first current direction and a second current direction are opposite to each other during power transmission,
in the first current direction, a current that flows through the first coil flowing so as to be wound around the first winding axis, and
in the second current direction, a current that flows through the second coil flowing so as to be wound around the second winding axis,
the first coil including
a first adjacent portion located adjacent to the second coil, and
a first spacer portion located on an opposite side of the first adjacent portion with respect to the first winding axis,
the second coil including
a second adjacent portion located adjacent to the first coil, and
a second spacer portion located on an opposite side of the second adjacent portion with respect to the second winding axis, the first adjacent portion being located higher than the first spacer portion, wherein the ferrite plate includes a first facing portion facing the first adjacent portion and a second facing portion facing the first spacer portion, wherein at least a part of the first facing portion is thicker than the second facing portion.

2. The power transmission device according to claim 1, wherein a part of the first adjacent portion is formed so as to be away from the second adjacent portion.

3. The power transmission device according to claim 2, wherein in a direction in which the first adjacent portion extends, a center portion of the first adjacent portion is farther away from the second adjacent portion than an end of the first adjacent portion is, and in a direction in which the second adjacent portion extends, a center portion of the second adjacent portion is farther away from the first adjacent portion than an end of the second adjacent portion is.

* * * * *